US012353262B2

(12) United States Patent
Jung et al.

(10) Patent No.: US 12,353,262 B2
(45) Date of Patent: Jul. 8, 2025

(54) COMPUTATION STORAGE DEVICE AND METHOD OF MANAGING POWER OF THE SAME

(71) Applicant: SAMSUNG ELECTRONICS CO., LTD., Suwon-si (KR)

(72) Inventors: Myungjune Jung, Suwon-si (KR); Euiseong Seo, Seongnam-si (KR); Hwaseok Oh, Suwon-si (KR); Jooyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 53 days.

(21) Appl. No.: 18/329,636

(22) Filed: Jun. 6, 2023

(65) Prior Publication Data

US 2024/0134435 A1 Apr. 25, 2024
US 2024/0231458 A9 Jul. 11, 2024

(30) Foreign Application Priority Data

Oct. 25, 2022 (KR) .......................... 10-2022-0138100

(51) Int. Cl.
*G06F 1/26* (2006.01)
(52) U.S. Cl.
CPC ...................... *G06F 1/26* (2013.01)
(58) Field of Classification Search
CPC ........ G06F 1/26; G06F 1/3203; G06F 1/3296; G06F 1/3287; G06F 1/3275; G06F 1/3268; G06F 1/189
See application file for complete search history.

(56) References Cited

U.S. PATENT DOCUMENTS

| | | | |
|---|---|---|---|
| 9,389,675 B2 | 7/2016 | Bose et al. | |
| 10,649,519 B2 | 5/2020 | Goda et al. | |
| 10,983,712 B2 | 4/2021 | Matsubara | |
| 11,269,523 B2 | 3/2022 | Sigaev et al. | |
| 11,379,031 B2 | 7/2022 | Navon et al. | |
| 2007/0050647 A1* | 3/2007 | Conroy | G06F 1/3203 713/300 |

(Continued)

FOREIGN PATENT DOCUMENTS

CN 110989815 A * 4/2020 ............... G06F 1/28

*Primary Examiner* — Jaweed A Abbaszadeh
*Assistant Examiner* — Hyun Soo Kim
(74) *Attorney, Agent, or Firm* — MORGAN, LEWIS & BOCKIUS LLP

(57) ABSTRACT

A device includes a storage device to receive a first power and transfer data, a computing device to receive a second power and perform computations on the data; a storage power manager to generate a storage power demand value from previous operation of the storage device; a computing power manager to generate a computing power demand value from previous operation of the computing device; and a global power manager to generate a storage target power value indicating a next power limit for the storage device and a computing target power value indicating a next power limit for the computing device, from both of the storage and computing power demand values, wherein the storage power manager provides the first power to the storage device based on the storage target power value, and the computing power manager provides the second power to the computing device based on the computing target power value.

20 Claims, 18 Drawing Sheets

(56) References Cited

U.S. PATENT DOCUMENTS

| | | | |
|---|---|---|---|
| 2010/0162006 A1* | 6/2010 | Therien | G06F 1/3203 |
| | | | 713/300 |
| 2011/0060927 A1* | 3/2011 | Fillingim | G06F 11/3034 |
| | | | 713/320 |
| 2015/0277521 A1* | 10/2015 | Jain | G06F 1/3225 |
| | | | 713/300 |
| 2016/0018883 A1* | 1/2016 | Varma | G06F 1/324 |
| | | | 713/323 |
| 2016/0124486 A1* | 5/2016 | Drake | G06F 1/3206 |
| | | | 713/320 |
| 2019/0050040 A1* | 2/2019 | Baskaran | G06N 3/063 |
| 2020/0401326 A1* | 12/2020 | Fujimoto | G06F 1/3225 |
| 2021/0303184 A1* | 9/2021 | Palmer | G06F 3/0625 |
| 2022/0100407 A1 | 3/2022 | Secatch et al. | |
| 2023/0060804 A1* | 3/2023 | Zhu | G06F 3/0679 |
| 2024/0004725 A1* | 1/2024 | Jain | G06F 9/5038 |

* cited by examiner

FIG. 5

| OPERATIONS | # OF OPERATIONS |
|---|---|
| ROh | Nhr |
| WOh | Nhw |
| ROc | Ncr |
| WOc | Ncw |
| ROm | Nmr |
| WOm | Nmw |

FIG. 6

| POWER MODE | OPERATION FREQUENCY | POWER CONSUMPTION |
|---|---|---|
| PWM1 | f1 | P1 |
| PWM2 | f2 | P2 |
| PWM3 | f3 | P3 |
| PWM4 | f4 | P4 |
| ⋮ | ⋮ | ⋮ |

COMPUTATION STORAGE DEVICE AND METHOD OF MANAGING POWER OF THE SAME

CROSS-REFERENCE TO RELATED APPLICATION

This U.S. non-provisional patent application claims priority under 35 USC § 119 to Korean Patent Application No. 10-2022-0138100, filed on Oct. 25, 2022, in the Korean Intellectual Property Office (KIPO), the disclosure of which is incorporated by reference herein in its entirety.

FIELD

This disclosure generally relates to semiconductor integrated circuits, and more particularly relates to a computation storage device and a method of managing the power of a computation storage device.

DISCUSSION

In a multi-component device having a plurality of components, it may be desirable to maximize performance of the plurality of components within a limited power budget. For example, if a 2.5-inch storage form factor has a steady-state power limit of 25 Watts, power consumption of a computation storage device may exceed that power limit if other components are integrated, such as a field-programmable gate array (FPGA) configured to perform an additional function, in addition to a storage device such as a solid-state drive (SSD). In such a computation storage device, both heating and power consumption should be considered, and a mechanism for performance balance between the components may be used to maintain the limited power budget. In particular, when an FPGA and an SSD that are both integrated in the computation storage device operate independently, relationships between workloads and powers of the FPGA and the SSD may be used for implementing the performance balance. Such schemes for the performance balance may have a complex structure, and it might not be trivial to obtain exact relationships between the workloads and the powers.

SUMMARY

Embodiments of the present disclosure may provide a computation storage device and a method of managing power of the computation storage device, capable of efficiently implementing a performance balance between a solid-state drive (SSD) and a field-programmable gate array (FPGA) included in the computation storage device.

Embodiments of the present disclosure may provide a multi-component device and a method of managing power of the multi-component device, capable of efficiently implementing a performance balance between a plurality of components included in the multi-component device.

According to an embodiment, a computation storage device includes: a storage device configured to receive a first controlled power, store data, and read the stored data; a computing device configured to receive a second controlled power, and perform computations on data to be stored in the storage device or on data read from the storage device; a storage power manager configured to periodically generate a storage power demand value based on previous performance of the storage device during a previous operation period of the storage device; a computing power manager configured to periodically generate a computing power demand value based on previous performance of the computing device during a previous operation period of the computing device; and a global power manager configured to periodically generate a storage target power value indicative of a next power limit for the storage device and a computing target power value indicative of a next power limit for the computing device, based on both of the storage power demand value and the computing power demand value, where the storage power manager is configured to provide the first controlled power to the storage device based on the storage target power value, where the computing power manager is configured to provide the second controlled power to the computing device based on the computing target power value.

According to an embodiment, a method of managing power of a computation storage device includes providing power to a storage device and a computing device through a power rail connected to a host device, controlling performance of the storage device based on a storage target power value indicating a power limit of the storage device, periodically generating a storage power demand value based on previous performance of the storage device during a previous operation period of the storage device, controlling performance of the computing device based on a computing target power value indicating a power limit of the computing device, periodically generating a computing power demand value based on previous performance of the computing device during a previous operation period of the computing device, and periodically generating the storage target power value and the computing target power value based on the storage power demand value and the computing power demand value.

According to an embodiment, a multi-component device includes a plurality of components configured to perform respective functions and receive power through a power rail connected to a host device, a plurality of component power managers configured to control performance of the plurality of components based on a plurality of component target power values indicating respective power limits of the plurality of components and periodically generate a plurality of component power demand values based on previous performance of the plurality of components during previous operation periods of the plurality of components, and a global power manager configured to periodically generate the plurality of component target power values based on the plurality of component power demand values.

BRIEF DESCRIPTION OF THE DRAWINGS

Embodiments of the present disclosure will be more clearly understood from the following detailed description when taken in conjunction with the accompanying drawings.

FIG. 5 is a tabular diagram illustrating generation of a storage power demand value of a computation storage device according to the embodiment of FIG. 4.

FIG. 6 is a tabular diagram illustrating generation of a computing power demand value of a computation storage device according to an embodiment.

DETAILED DESCRIPTION

Figure 1:
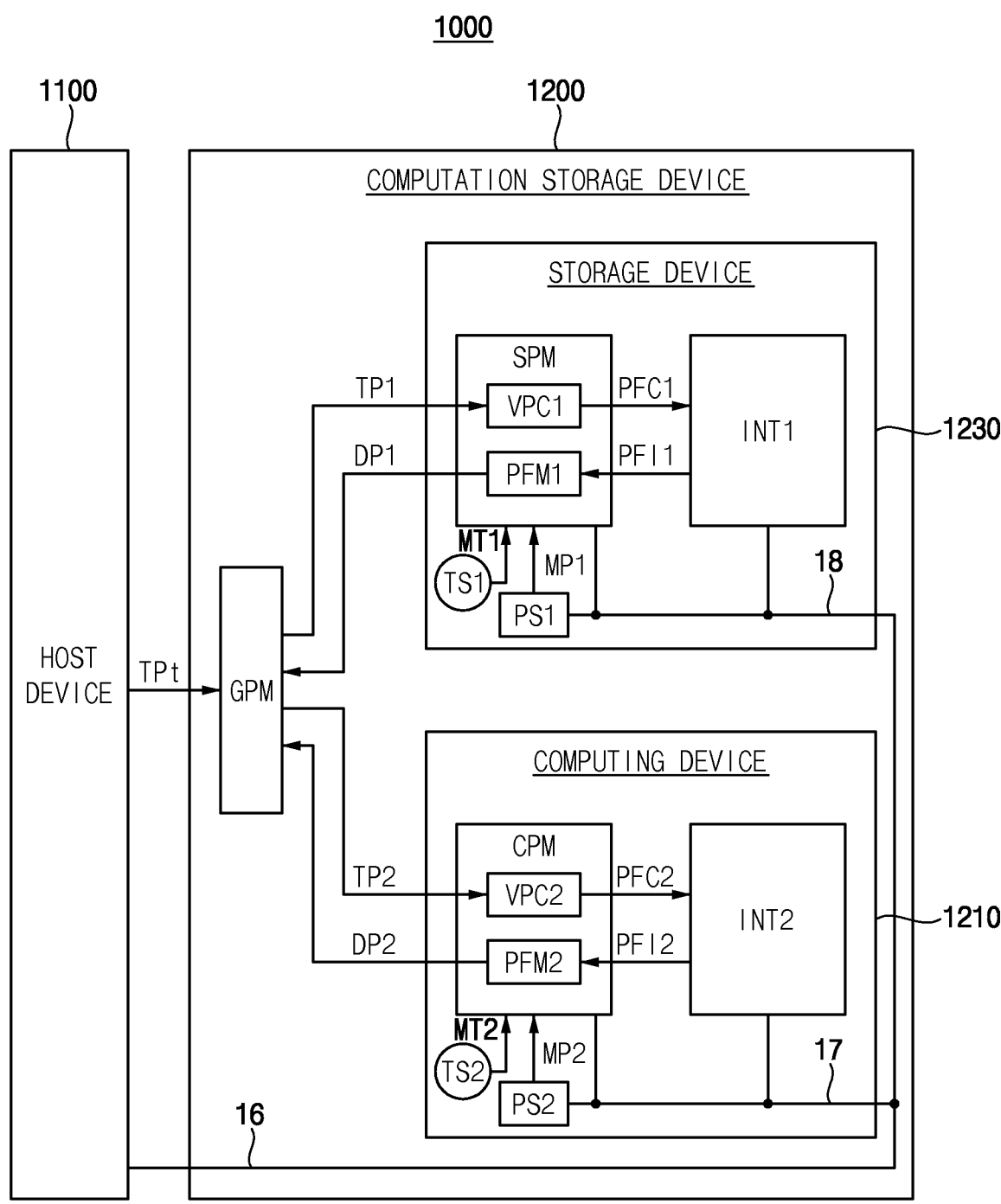
FIG. 1 is a block diagram illustrating a system including a computation storage device according to an embodiment.

Embodiments of the present disclosure will be described more fully hereinafter by way of example with reference to the accompanying drawings, in which non-limiting examples are shown. In the drawings, like reference numerals may refer to like elements throughout. Substantially duplicate description of like elements may be omitted.

A computation storage device, multi-component device and/or method of managing power, according to illustrative embodiments of the present disclosure, may efficiently implement a performance balance between a plurality of components to control their respective powers while meeting a total power limit, such as but not limited to a steady-state power limit, by monitoring the performance of each component to periodically generate individual power demand values and independently distributing a permitted total power among the plurality of components based on the power demand values.

Figure 2:
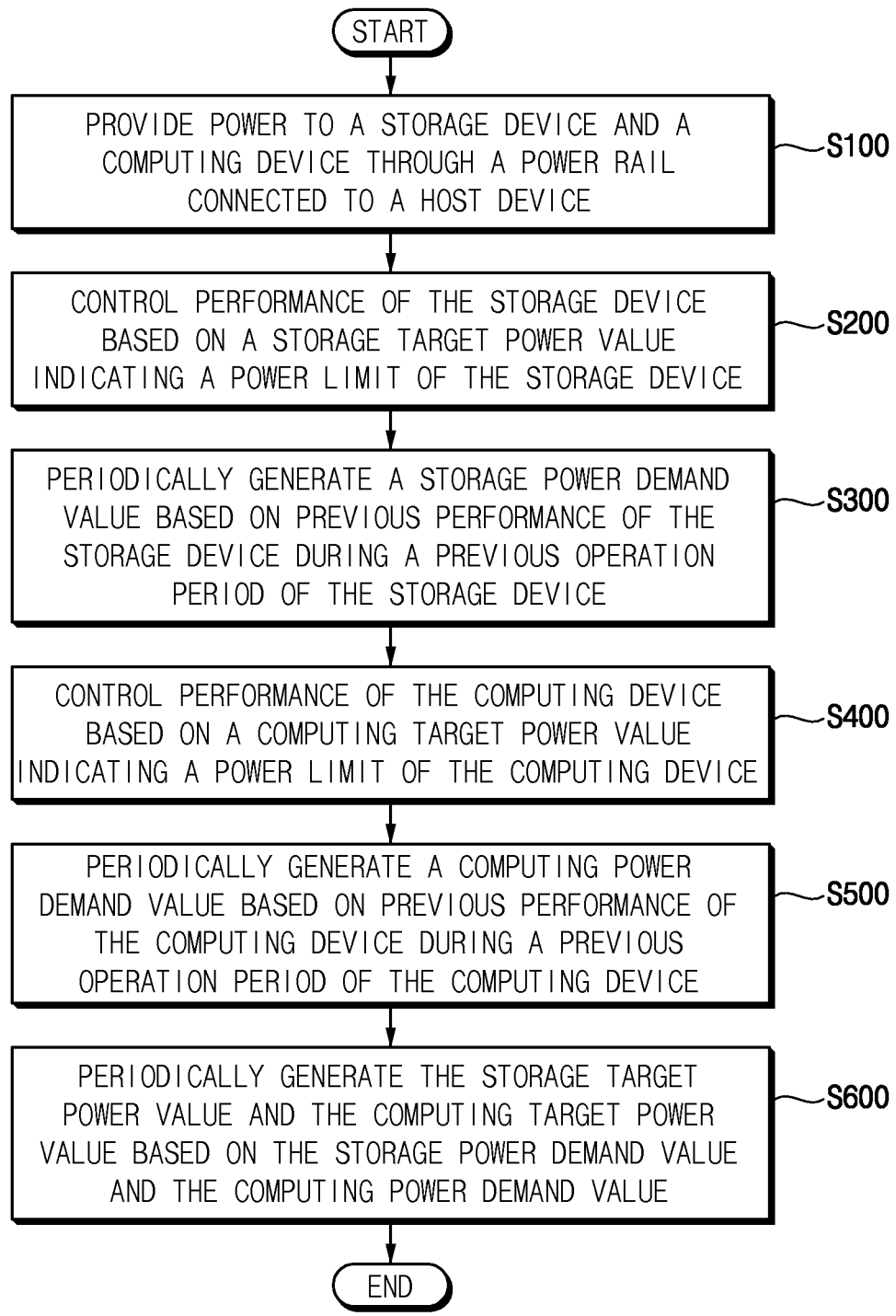
FIG. 2 is a flowchart diagram illustrating a method of managing power of a computation storage device according to an embodiment.

FIG. 1 illustrates a system including a computation storage device according to an embodiment, and FIG. 2 illustrates a method of managing power of a computation storage device according to an embodiment.

Referring to FIG. 1, a system 1000 includes a host device 1100 and a computation storage device 1200. The computation storage device 1200 may be controlled by the host device 1100 to provide a service corresponding to a request from the host device 1100. For example, the computation storage device 1200 may store data transferred from the host device 1100, provide data read from the computation storage device 1200 to the host device 1100, and process or perform computations on data from the host device 1100 or data stored in the computation storage device 1200, in response to the request from the host device 1100.

The computation storage device 1200 may include a computing device 1210, a storage device 1230, a global power manager GPM, a storage power manager SPM and a computing power manager CPM. The storage device 1230 may perform a function of storing data, and the computing device 1210 may perform a function of processing or performing computations on data read from the storage device 1230 or data to be stored in the storage device 1230. The computing device 1210 and the storage device 1230 may correspond to unit components, where the performance and power consumption of each unit component may be controlled independently.

Referring to FIGS. 1 and 2, power may be provided to the computing device 1210 and the storage device 1230 through a power rail 16 connected to the host device 1100 at step S100. The power provided through the power rail 16 may be distributed to the computing device 1210 and the storage device 1230 through internal wirings 17 and 18, respectively.

The storage power manager SPM may control performance of the storage device 1230 based on a storage target power value TP1 indicating a power limit of the storage device 1230 at step S200. In addition, the storage power manager SPM may periodically generate a storage power demand value DP1 based on previous performance of the storage device 1230 during a previous operation period of the storage device 1230 at step S300. In an embodiment, the storage power manager SPM may be included in the storage device 1210 as illustrated in FIG. 1, but embodiments are not limited thereto.

The computing power manager CPM may control performance of the computing device 1210 based on a computing target power value TP2 indicating a power limit of the computing device 1210 at step S400. In addition, the computing power manager CPM may periodically generate a computing power demand value DP2 based on previous performance of the computing device 1210 during a previous operation period of the computing device 1210 at step S500. In an embodiment, the computing power manager CPM may be included in the computing device 1210 as illustrated in FIG. 1, but embodiments are not limited thereto.

In an embodiment, as may be described in greater detail, infra, the performance of the storage device 1230 may correspond to an input-output bandwidth of the storage device 1230, and the performance of the computing device 1210 may correspond to an operation frequency of the computing device 1210.

The global power manager GPM may periodically generate the storage target power value TP1 and the computing target power value TP2 based on the storage power demand value DP1 and the computing power demand value DP2 at step S600.

FIG. 1 illustrates that the global power manager GPM is disposed outside the computing device 1210 and the storage device 1230, but embodiments are not limited thereto. In an embodiment, the global power manager GPM may be included in one of the computing device 1210 and/or the storage device 1230. In an embodiment, the global power manager GPM may be included in the host device 1100.

Figure 3:
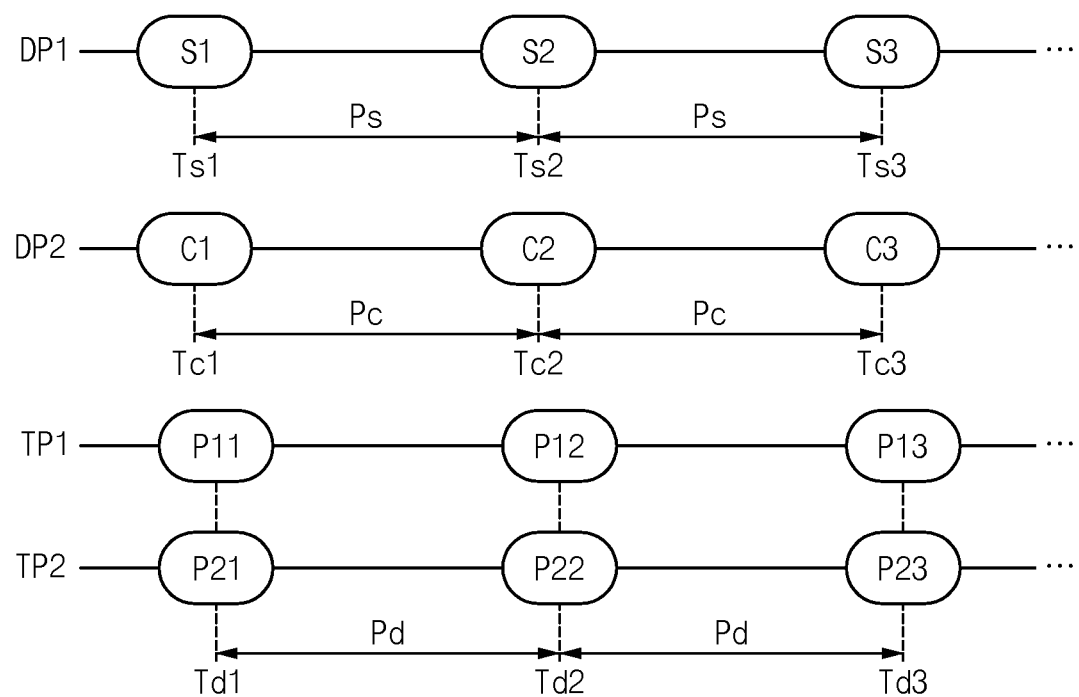
FIG. 3 is a timing diagram illustrating operation timing of a computation storage device according to an embodiment.

In an embodiment, as may be described in greater detail, infra, with reference to FIG. 3, the global power manager GPM may determine the storage target power value TP1 and the computing target power value TP2 by dividing a total target power value TPt indicating a power limit of the entire computation storage device 1200 based on the storage power demand value DP1 and the computing power demand value DP2. The total target power value TPt may be provided based on a command or a request transferred from the host device 1100. The total target power value TPt may be included in the command or may be provided through a data bus when the command is transferred through a command-address bus. In an embodiment, the total target power value TPt may be provided through control lines distinct from the command-address bus and the data bus.

The storage device 1230 may include the storage power manager SPM and an internal circuit INT1 for storing data. The storage power manager SPM may include a storage variable performance controller VPC1 and a storage performance monitor PFM1.

The storage variable performance controller VPC1 may generate, based on the storage target power value TP1 provided form the global power manager GPM, a storage performance control value PFC1 to control the power consumption and the performance of the internal circuit INT1. The internal circuit INT1 may control the performance of the storage device 1230 based on the storage performance control value PFC1 such that the power consumption of the storage device 1230 need not exceed the power corresponding to the storage target power value TP1. Embodiments of the storage variable performance controller VPC1 may be described in greater detail, infra, with reference to FIGS. 9, 10 and 11.

The storage performance monitor PFM1 may generate the storage power demand value DP1 indicating previous performance of the storage device 1230 during the previous operation period of the storage device 1230 based on storage performance information PFI1 provided from the internal circuit INT1. Example embodiments of generating the storage power demand value DP1 may be described in greater detail, infra, with reference to FIGS. 4 and 5.

The computing device 1210 may include the computing power manager CPM and an internal circuit INT2 processing or performing computations on data. The computing power manager CPM may include a computing variable performance controller VPC2 and a computing performance monitor PFM2.

The computing variable performance VPC2 may generate, based on the computing target power value TP2 provided form the global power manager GPM, a computing performance control value PFC2 to control the power consumption and the performance of the internal circuit INT2. The internal circuit INT2 may control the performance of the computing device 1210 based on the computing performance control value PFC2 such that the power consumption of the computing device 1210 need not exceed the power corresponding to the computing target power value TP2. Example embodiments of the computing variable performance controller VPC2 may be described in greater detail, infra, with reference to FIGS. 9, 10 and 11.

The computing performance monitor PFM2 may generate the computing power demand value DP2 indicating previous performance of the computing device 1210 during the previous operation period of the computing device 1210 based on computing performance information PFI2 provided from the internal circuit INT2. Examples of generating the computing power demand value DP2 may be described in greater detail, infra, with reference to FIGS. 6, 7 and 8.

In an embodiment, the storage device 1230 may include a storage power sensor PS1 and the computing device 1210 may include a computing power sensor PS2. The storage power sensor PS1 may be connected to the internal wiring 18 that is branched from the power rail 16, and generate a measured storage device power value MP1 by measuring the power consumption of the storage device 1230. The computing power sensor PS2 may be connected to the internal wiring 17 that is branched from the power rail 16, and generate a measured computing device power value MP2 by measuring the power consumption of the computing device 1210. In an embodiment, the storage power sensor PS1 and the computing power sensor PS2 may be implemented with software or firmware to compute the measured storage power value MP1 and the measured computing power value MP2 based on the performance of the storage device 1230 and the computing device 1210, respectively.

In an embodiment, the storage device 1230 may further include a storage temperature sensor TS1, and the computing device 1210 may further include a computing temperature sensor TS2. The storage temperature sensor TS1 may generate a storage device temperature value MT1 by measuring an operation temperature of the storage device 1230. The computing temperature sensor TS2 may generate a computing device temperature value MT2 by measuring an operation temperature of the computing device 1210.

Figure 9:
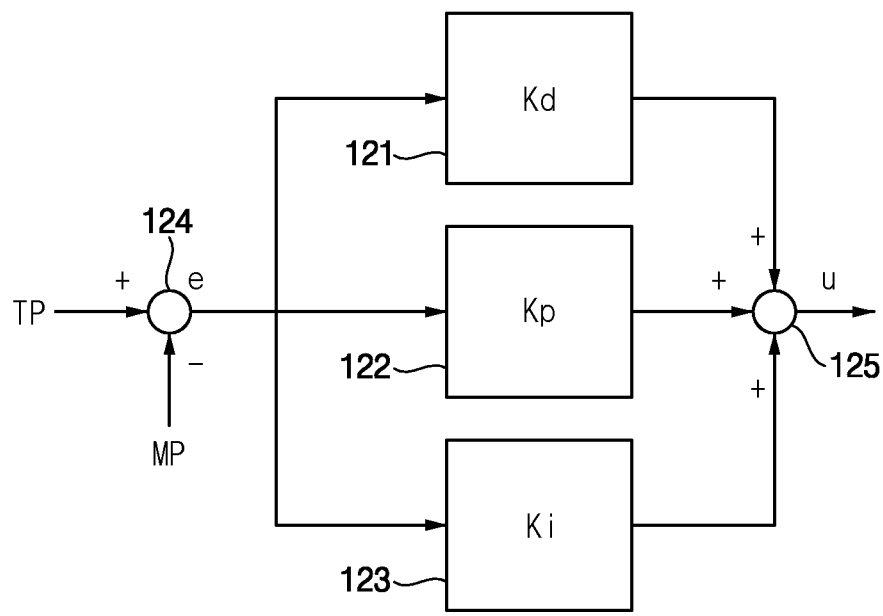
FIGS. 9, 10 and 11 are block diagrams illustrating a variable performance controller included in a computation storage device according to an embodiment.
Figure 10:
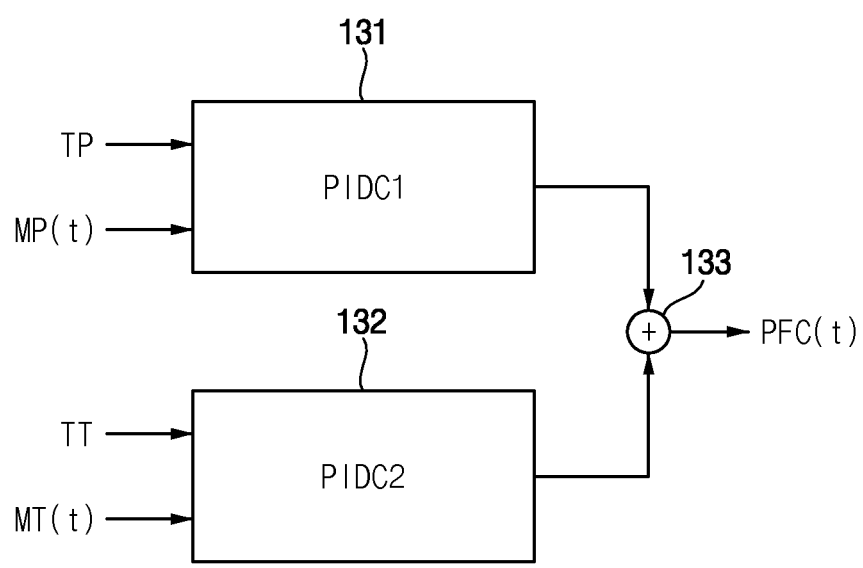
Figure 11:
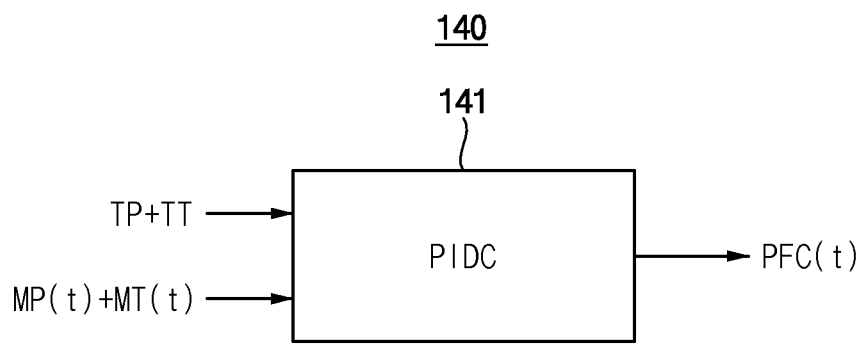

As may be described in greater detail, infra, with reference to FIGS. 9, 10 and 11, the respective power consumptions of the storage device 1230 and the computing device 1210 may be controlled based on the measured values MP1, MP2, MT1 and MT2.

In an embodiment, the storage performance control value PFC1 and the computing performance control value PFC2 may be provided to the internal circuits INT1 and INT2, respectively, as illustrated in FIG. 1. In this case, the internal circuits INT1 and INT2 may perform throttling, dynamic voltage and frequency scaling (DVFS), or the like. for power and performance control.

Figure 19:
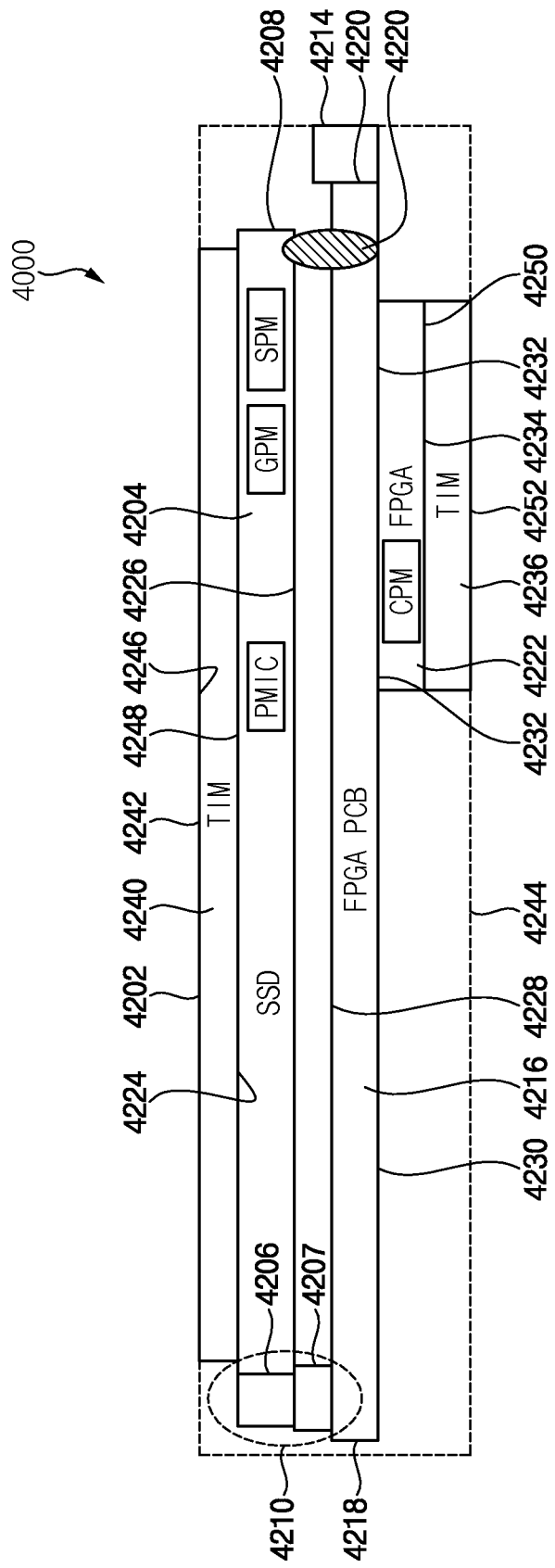
FIG. 19 is a cross-sectional view diagram illustrating a computation storage device of FIG. 18.

In an embodiment, as may be described in greater detail, infra, with reference to FIG. 19, the computation storage device 1200 may further include a power management integrated circuit (PMIC) configured to control overall power consumptions of the computation storage device 1200. In this case, the storage performance control value PFC1 and the computing performance control value PFC2 may be provided to the PMIC directly or through the internal circuits INT1 and INT2, such that the PMIC may perform throttling, DVFS, or the like. for power and performance control.

In determining the rated power consumption of the computing device 1210 and the storage device 1230 in the computation storage device 1200, a situation may arise in which the performance of each device is limited due to the statically determined upper power limit for each device even though there is margin for the total power consumption because the activation cycle of each device is different from each other. A task executed on the computation storage device 1200 may generally consist of three steps: loading data from storage into a computation buffer, computing using the loaded data, and storing the resulting data in storage. In the above three stages, the data input-output of the computation buffer is mainly handled by the storage device 1230, and the computing is mainly handled by the computing device 1210, and only one device consumes power intensively during this situation.

At the time when one device is intensively used, other device has a sufficient margin in power usage, but the intensively used device is limited in performance due to the upper limit of the allowable power.

According to an embodiment, performance changes or load changes of the computing device 1210 and the storage device 1230 may be observed and the overall performance of the computation storage device 1200 may be controlled based on a model capable of comparing the strength of performance requirements of each device by dynamically adjusting the upper limit of power consumption for each device. Compared to the method of statically distributing the upper limits of the power to each device, each device may consume higher power as needed to improve performance.

As such, the computation storage device 1200 and the method of managing power according to an embodiment may efficiently implement performance balance between the plurality of components such as the storage device 1230 and the computing device 1210 and meet the power limit by monitoring the performance of each component to periodically generate the power demand values DP1 and DP2 and distributing the permitted power to the plurality of components based on the target power values TP1 and TP2.

FIG. 3 illustrates operation timing of a computation storage device according to an embodiment.

Referring to FIGS. 1 and 3, the storage performance monitor PFM1 of the storage power manager SPM may periodically generate and provide the storage power demand value DP1 with a first cyclic period Ps, and the computing performance monitor PFM2 of the computing power manager CPM may periodically generate and provide the computing power demand value DP2 with a second cyclic period Pc. In an embodiment, as illustrated in FIG. 3, the first cyclic period Ps may be identical to the second cyclic period Pc, and time points Ts1, Ts2 and Ts3 of providing the storage power demand values S1, S2 and S3 may be synchronized with time points Tc1, Tc2 and Tc3 of providing the computing power demand values C1, C2 and C3, but embodiments are not limited thereto.

The global power manager GPM may determine the storage target power value TP1 and the computing target power value TP2 based on the storage power demand value DP1 that was most recently generated by the storage power manager SPM and the computing power demand value DP2 that was most recently generated by the computing power manager CPM. In the example of FIG. 3, the global power manager GPM may determine and provide the target power values P11 and P21 at time point Td1 based on the power demand values S1 and C1, the target power values P12 and P22 at time point Td2 based on the power demand values S2 and C2, and the target power values P13 and P23 at time point Td3 based on the power demand values S3 and C3.

In an embodiment, the global power manager GPM may determine and provide the storage target power value TP1 and the computing target power value TP2 by dividing the total target power value TPt indicating the power limit of the entire computation storage device 1200 based on the storage power demand value DP1 and the computing power demand value DP2.

The global power manager GPM may dynamically adjust the upper power limits of the storage device 1230 as TP1 and of the computing device 1210 as TP2 depending on changes in the power demands of the storage device 1230 and the computing device 1210, respectively, within the upper power limit of the total target power value as TPt for the entire computation storage device 1200.

In an embodiment, the global power manager GPM may determine the storage target power value TP1 and the computing target power value TP2 based on Expression 1 and Expression 2.

$$TP1=TPt\times(DP1/(DP1+DP2)) \qquad \text{(Expression 1)}$$

$$TP2=TPt\times(DP2/(DP1+DP2)) \qquad \text{(Expression 2)}$$

In Expression 1 and Expression 2, TPt indicates the total target power value for the power limit of the entire computation storage device 1200, TP1 indicates the storage target power value of the storage device 1230, TP2 indicates the computing target power value of the computing device 1210, DP1 indicates the storage power demand value of the storage device 1230, and DP2 indicates the computing power demand value of the computing device 1210.

Once that the storage target power value TP1 and the computing target power value TP2 are determined, the storage device 1230 and the computing device 1210 may meet the respective power limit through the device-specific schemes such as throttling, DVFS, and so on.

Figure 4:
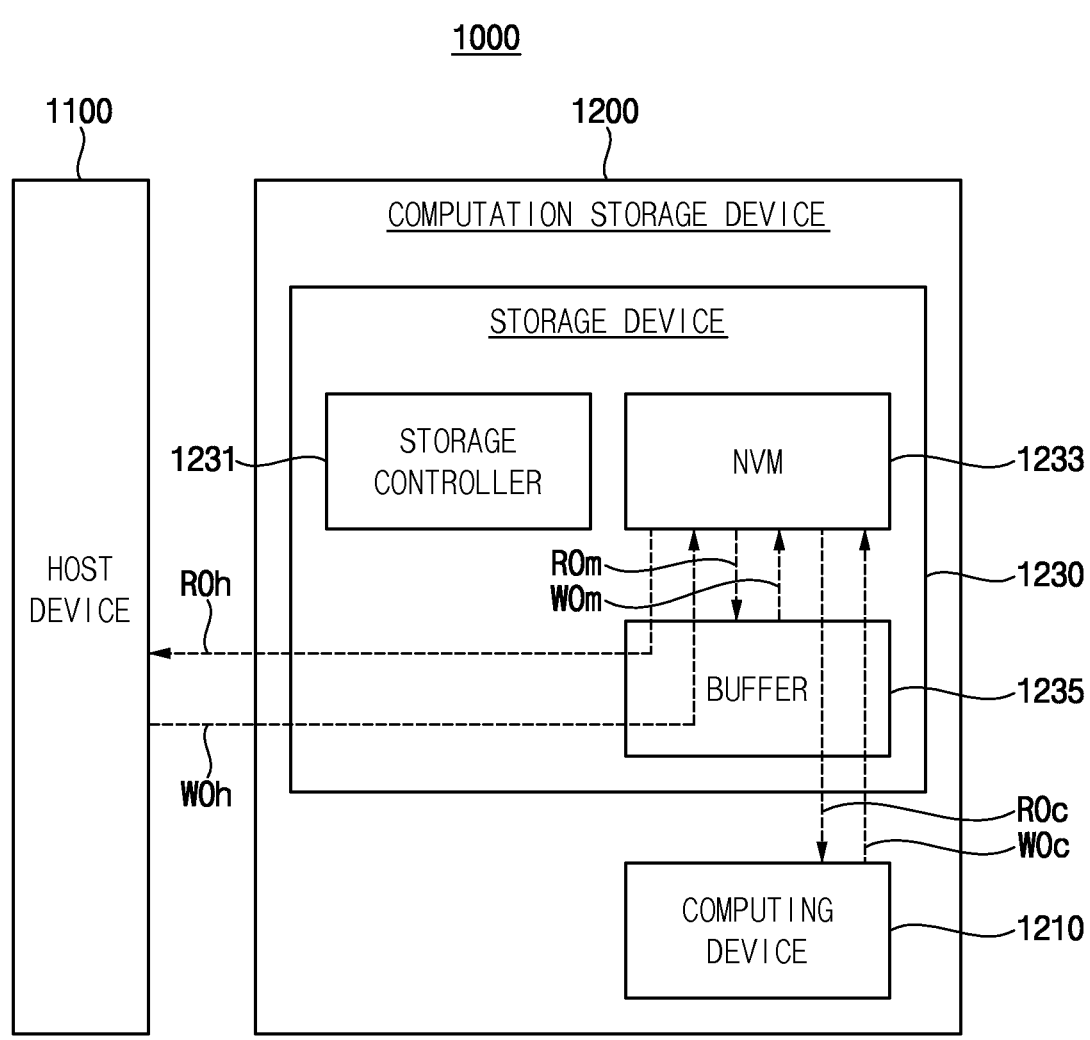
FIG. 4 is a block diagram illustrating generation of a storage power demand value of a computation storage device according to an embodiment.

FIGS. 4 and 5 illustrate an embodiment of generating a storage power demand value of a computation storage device according to an embodiment.

FIG. 4 illustrates data flow according to operations of a computation storage device 1200. Referring to FIG. 4, a system 1000 may include a host device 1100 and a computation storage device 1200, and a computation storage device 1200 may include a computing device 1210 and a storage device 1230. The storage device 1230 may include a storage controller 1231, a nonvolatile memory device NVM 1233 and a buffer 1235. Hereinafter, descriptions repeated with FIG. 1 may be omitted.

The storage power monitor (e.g., PFM1 in FIG. 1) included in the storage power manager (e.g., SPM in FIG. 1) may determine the storage power demand value DP1 based on a ratio of performance of the storage device 1230 during the previous operation period with respect to a maximum performance of the storage device 1230.

A first read operation ROh indicates an operation where data stored in the nonvolatile memory device NVM is provided to the host device 1100 through the buffer 1235, and a first write operation WOh indicates an operation where data from the host device 1100 is stored in the nonvolatile memory device NVM through the buffer 1235. A second read operation ROc indicates an operation where data stored in the nonvolatile memory device NVM is provided to the computing device 1210 through the buffer 1235, and a second write operation WOc indicates an operation where processed data from the computing device 1210 is stored in the nonvolatile memory device NVM through the buffer 1235.

Compared with such first data input-output operations ROh, WOh by the requests of the host device 1100, and second data input-output operations ROc and WOc by the requests of the computing device 1210, respectively, third data input-output operations including a third read operation ROm and a third write operation WOm may be associated with internal management operations that are performed without necessarily the requests from the host device 1100 or the computing device 1210. The third read operation ROm and the third write operation WOm may be associated with the management operations of the storage device 1230 such as garbage collection, wear leveling, or the like., which have comparatively little relevance to the user's performance experience. Therefore, the storage power manager SPM may determine the storage power demand value DP1 based on a ratio of the data input-output operations ROh, WOh, ROc and WOc performed by the storage device 1230 according to the requests from the host device 1100 and/or the computing device 1210 during the previous operation and the management operations ROm and WOm performed by the storage device 1230 without requests from the host device 1100 and/or computing device 1210 during the previous operation period.

In the storage device 1230, the read operation consumes less power than the write operation. The more read operations out of the total operations, the smaller the upper power limit that may satisfy the storage power demand. Therefore, the storage power manager SPM may determine the storage power demand value DP1 based on a ratio of the write operations performed by the storage device 1230 during the previous operation period and the read operations performed by the storage device 1230 during the previous operation period.

In an embodiment, considering the above factors, the storage power manager SPM may determine the storage power demand value DP1 based on Expression 3.

$$DP1 = PR \times [(1-\alpha) \times WR + \alpha] \times \beta \quad \text{(Expression 3)}$$

In Expression 3, DP1 indicates the storage power demand value of the storage device 1230, PR indicates the ratio of performance of the storage device 1230 during the previous operation period with respect to the maximum performance of the storage device 1230, α indicates the ratio of the read operations performed by the storage device during the previous operation period with respect to the read operations and write operations performed by the storage device 1230 during the previous operation period, WR indicates a weight constant value of the write operations with respect to the read operations, and β indicates the ratio of data input-output operations ROh, WOh, ROc and WOc performed by the storage device 1230 according to the requests from the host device 1100 and/or computing device 1210 with respect to the entirety of operations performed by the storage device 1230 during the previous operation period.

The weight constant value WR may be determined depending on a system including the computation storage device 1200. The weight constant value WR may be greater than 1 because the write operation requires more power than the read operation.

FIG. 5 illustrates an example of the above-described storage performance information PFI1 including numbers Nhr, Nhw, Ncr, New, Nmr and Nmw of the respective operations ROh, WOh, ROc, WOc, ROm and WOm that are performed during the previous operation period of the storage device 1230. The parameters PR, α and β in Expression 3 may be determined as Expression 4, based on the numbers of FIG. 5.

$$Nt = Nhr + Nhw + Ncr + Ncw + Nmr + Nmw$$

$$PR = Nt/Nmax$$

$$\alpha = (Nhr + Ncr + Nmr)/Nt$$

$$\beta = (Nmr + Nmw)/Nt \quad \text{(Expression 4)}$$

In Expression 4, Nmax indicates a maximum operation number corresponding to the maximum performance of the storage device 1230, which may be determined according to the specification of the storage device 1230.

As described with reference to FIGS. 4 and 5, the degree of the performance demand of the storage device 1230 may be monitored in real-time and the storage power demand value DP1 may be determined dynamically.

Figure 7:
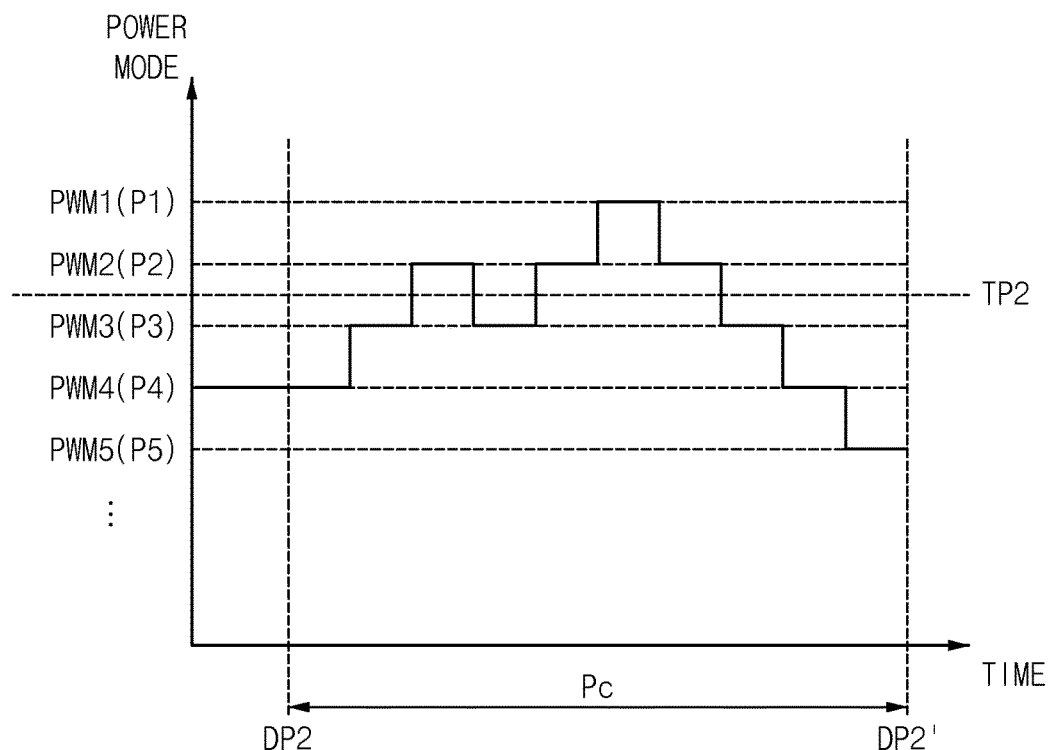
FIGS. 7 and 8 are timing diagrams illustrating generation of a computing power demand value of a computation storage device according to the embodiment of FIG. 6.
Figure 8:
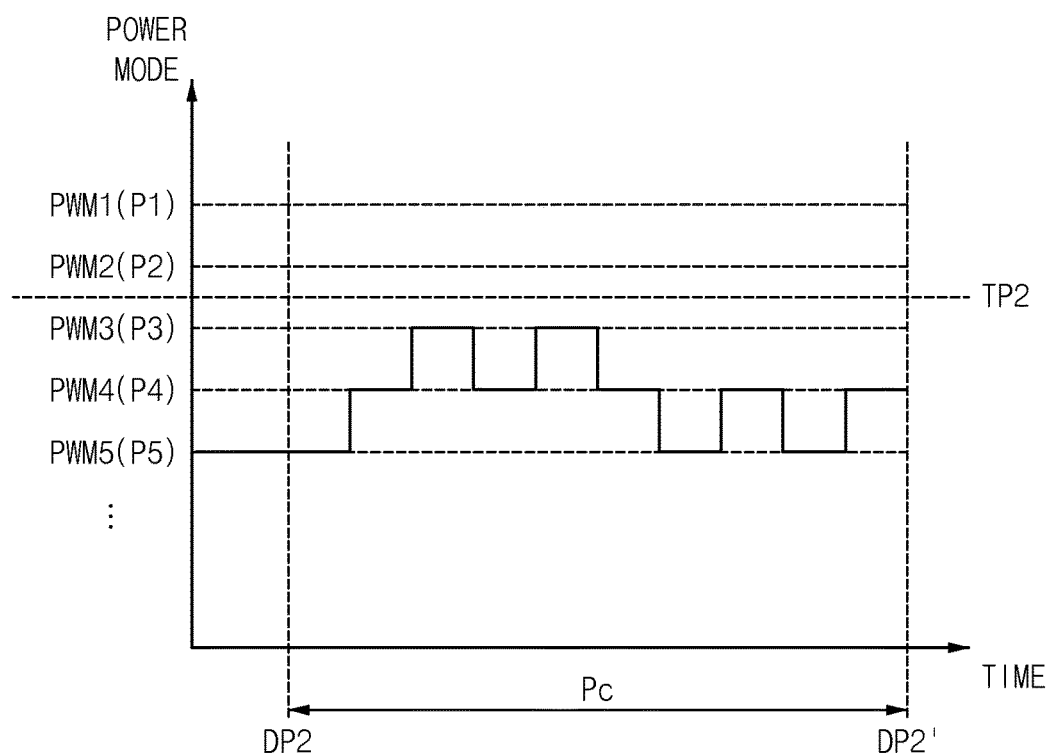

FIGS. 6, 7 and 8 illustrate an embodiment of generating a computing power demand value of a computation storage device according to an embodiment.

FIG. 6 illustrates an example of a plurality of power modes PWM1~PWM5 of the computing device 1210, corresponding operation frequencies f1~F5 and corresponding power consumptions P1~P5. The operation frequencies f1~f5 may be determined to be different from each other and thus the power consumptions P1~P5 may be different from each other. For example, as the subscript i of PWMi is smaller, the power mode may have a higher operating frequency and higher power consumption. That is, in the example of FIG. 6, PWM1 corresponds to the highest operating frequency f1 and the highest power consumption P1.

The power level scaling of the computing device 1210 may be implemented with the DVFS scheme that dynamically changes the operation frequency and/or the operation voltage depending on the operation status (e.g., workload) of the computing device 1210.

Among the plurality of power modes PWM1~PWM5 respectively corresponding to the plurality of different power consumptions P1~P5, the computing device 1210 may dynamically change an operation power mode corresponding to workload of the computing device 1210, such that power consumption of the computing device 1210 does not exceed power consumption corresponding the computing target power value TP2. FIGS. 7 and 8 illustrate examples of the operation power mode that is changed during one operation period Pc.

FIG. 7 illustrates an example case when the host device 1100 requests the workload to the computing device 1210 during the previous operation period Pc where power consumption of the computing device 1210 exceeds power consumption corresponding to the computing target power value TP2. Under the control of the computing variable performance controller VPC2 in the computing power manager CPM, the operation power mode of the computing device 1210 may be permitted up to the power mode PWM3, and the exceeding power modes PWM2 and PWM1 may be inhibited. In this case, the computing power manager CPM may determine the computing power demand value DP2' of the next operation period by increasing the computing power demand value DP2 of the previous operation period Pc. For example, the computing power manager CPM may determine the computing power demand value DP2' of the next operation period by increasing the computing power demand value DP2 of the previous operation period by a fixed value or a fixed rate.

FIG. 8 illustrates an example case when the host device 1100 requests workload to the computing device 1210 during the previous operation period Pc such that power consumption of the computing device 1210 does not exceed power consumption corresponding to the computing target power value TP2. The computing variable performance controller VPC2 may change the operation power mode of the computing device 1210 without throttling. In this case, the computing power manager CPM may determine the computing power demand value DP2' of the next operation period based on a ratio P3/P1 of the maximum operation power consumption P3 of the operation power mode during the previous operation period Pc with respect to a maximum power consumption P1 among the plurality of power consumptions P1~P5.

As described with reference to FIGS. 6, 7 and 8, the degree of the performance demand of the computing device 1210 may be monitored in real-time and the computing power demand value DP2 may be determined dynamically.

FIGS. 9, 10 and 11 illustrate an embodiment of a variable performance controller included in a computation storage device according to an embodiment.

The storage variable performance controller VPC1 and the computing variable performance controller VPC2 described with reference to FIG. 1 may be implemented with a PID controller as will be described with reference to FIG. 9, but embodiments are not limited thereto.

Referring to FIG. 9, a PID controller 120 may include a differential control unit 121, a proportional control unit 122, an integral control unit 123, a subtraction unit 124 and an addition unit 125.

The subtraction unit 124 subtracts a measured power value MP from a target power value TP and provides a difference value e(t) to the differential control unit 121, the proportional control unit 122 and the integral control unit 123. The addition unit 125 sums the outputs of the differential control unit 121, the proportional control unit 122 and the integral control unit 123 and provides a variable performance control value u(t). The difference value e(t) and the variable performance control value u(t) are expressed as a function of time and satisfy Expression 5.

$$u(t) = k_p e(t) + k_i \int_0^t e(\tau)d\tau + k_d \frac{de(t)}{dt} \quad \text{(Expression 5)}$$

In Expression 5, Kp indicates a proportional gain, Ki indicates an integral gain and Kd indicates a differential gain. The measured power value MP is varied depending on the variable performance control value u(t), and the measured power value MP corresponding to the variable performance control value u(t) is fed back to the subtraction unit 124. Through such a feedback loop operation, the variable performance control value u(t) may be generated such that the measured power value MP may converge to the target power value TP.

The proportional control unit 122 outputs a value proportional to the error or the difference value e=TP−MP and the proportional gain Kp may be determined as a proper value through various methods. As the proportional gain Kp is increased, the variability of the variable performance control value u(t) increases and the variable performance control value u(t) may converge rapidly. If the proportional gain Kp is too small, the response is slow and thus the variable performance control value u(t) might not converge. If the proportional gain Kp is too great, the response is rapid but overshoot may be caused. The integral control unit 123 integrates the difference value e(t) and outputs integrated value to remove a steady state error.

Using the PID controller 120, the variable performance controller in each component (e.g., the storage device 1230 and the computing device 1210) may generate the variable performance control value u(t) based on the target power value TP and the measured power value MP such that the measured power value MP may converge to the target power value TP. The variable performance control values PFC1 and PFC2 in in FIG. 1 may be equal to or generated based on the output u(t) of the PID controller 120 of FIG. 9. The storage device 1230 and the computing device 1210 may perform the schemes such as throttling, DVFS, or the like. based on the performance control values PFC1 and PFC2 to meet the power consumption corresponding to the target power values TP1 and TP2.

As described with reference to FIG. 1, the storage device 1230 may include the storage power sensor PS1 configured to generate the measured storage power value MP1 corresponding to the performance of the storage device 1230. In this case, the storage variable performance controller VPC1 in the storage power manager SPM may change the performance of the storage device 1230 based on the storage target power value TP1 and the measured storage power value MP1, as described with reference to FIG. 9.

In addition, the computing device 1210 may include the computing power sensor PS2 configured to generate the measured computing power value MP2 corresponding to the performance of the computing device 1210. In this case, the computing variable performance controller VPC2 in the computing power manager CPM may change the performance of the computing device 1210 based on the computing target power value TP2 and the measured computing power value MP2, as described with reference to FIG. 9.

FIGS. 10 and 11 illustrate an embodiment of a variable performance controller operating based on an operation temperature in addition to power.

Referring to FIG. 10, a variable performance controller 130 may include a first PID controller 131, a second PID controller 132 and an addition unit 133. The configuration and operation of the first PID controller 131 and the second PID controller 132 are the same as described with reference to FIG. 9.

The first PID controller 131 may generate a first output value based on a difference between the target power value TP and the measured power value MP(t) varying over time such that the measured power value MP(t) may converge to the target power value TP as described with reference to FIG. 9.

The second PID controller 132 may generate a second output value based on a difference between a target temperature value TT and an operation temperature value MT(t) or a measured temperature value MT(t) varying over time such that the measured temperature value MT(t) may converge to the target temperature value TT.

The addition unit 133 may sum the first output value from the first PID controller 131 and the second output value from the second PID controller 132 and generate a final variable performance control value PFC(t) reflecting the operation temperature and the power.

Referring to FIG. 11, a variable performance controller 140 may be implemented with a single PID controller 141. The configuration and operation of the PID controller 141 are the same as described with reference to FIG. 9.

The PID controller 141 may receive a target value TP+TT, corresponding to a sum of a target power value TP and a target temperature value TT, and a measure value MP(t)+MT(t) corresponding to a sum of a measured power value MP(t) and a measure temperature value MT(t). The PID controller 141 may generate a variable performance control value PFC(t) based on a difference between the target value TP+TT and the measure value MP(t)+MT(t) such that the measure value MP(t)+MT(t) may converge to the target value TP+TT. The operation stability of the computation storage device 1200 may be enhanced by controlling the performance considering the operation temperature in addition to the power.

As described with reference to FIGS. 1, the storage device 1230 may include the storage power sensor PS1 configured to generate the measured storage power value MP1 corresponding to the performance of the storage device 1230 and the storage temperature sensor TS1 configured to generate the storage temperature value MT1 by measuring an operation temperature of the storage device 1230. In this case, the storage power manager SPM may change the performance of the storage device 1230 based on the storage target power value TP1, the measured storage power value MP1, the storage temperature value MT1 and a storage target temperature value TT1 indicating an upper limit of the operation temperature of the storage device 1230, as described with reference to FIGS. 10 and 11.

In addition, the computing device 1210 may include the computing power sensor PS2 configured to generate the measured computing power value MP1 corresponding to the performance of the computing device 1210 and the computing temperature sensor TS2 configured to generate the computing temperature value MT2 by measuring an operation temperature of the computing device 1210. In this case, the computing power manager CPM may change the performance of the computing device 1210 based on the computing target power value TP2, the measured computing power value MP2, the computing temperature value MT2 and a computing target temperature value TT2 indicating an upper limit of the operation temperature of the computing device 1210.

Figure 12:
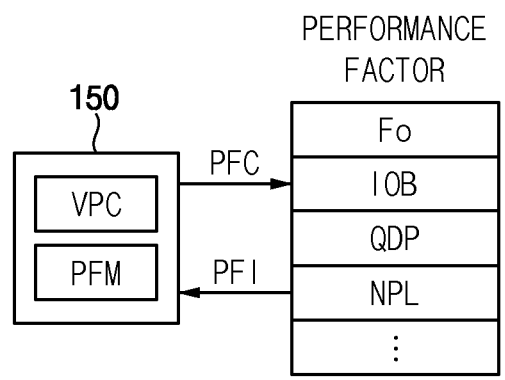
FIG. 12 is a block diagram illustrating performance factors for managing power of a computation storage device according to an embodiment.

FIG. 12 illustrates an embodiment of performance factors for managing power of a computation storage device according to an embodiment.

Referring to FIG. 12, various performance factors may be adjusted based on a performance control value PFC generated from a performance controller 150, which may be the storage power manager SPM or the computing power manager CPM as described above. In addition, the above-described power demand values may be generated based on the performance information PFI corresponding to the various performance factors. The performance factors may include an operation frequency Fo, an input-output bandwidth 10B, a queue depth QDP indicating a maximum number of requests stored in a request queue, a maximum number NPL of memory planes that may be activated simultaneously, or the like.

Figure 13:
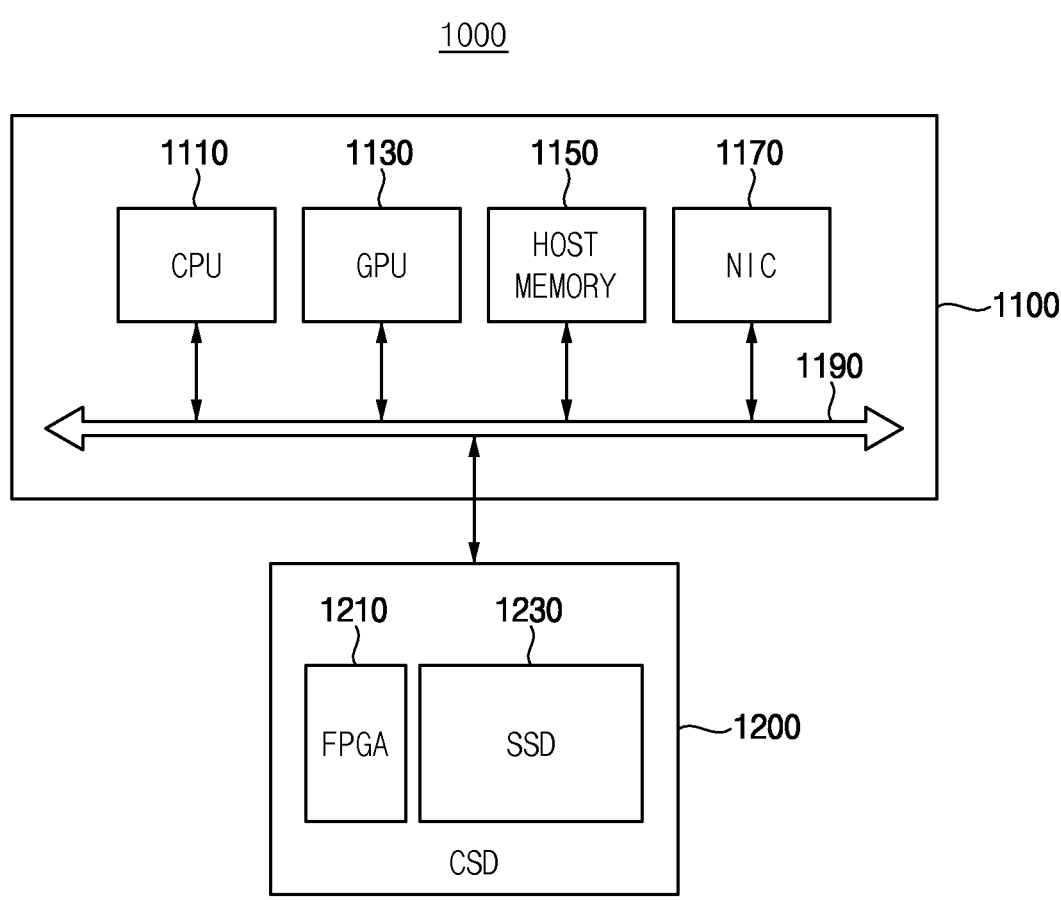
FIG. 13 is a block diagram illustrating a system including a computation storage device according to an embodiment.

FIG. 13 illustrates a system including a computation storage device according to an embodiment.

A system 1000 of FIG. 13 may be one of a desktop computer, a laptop computer, a tablet computer, a smartphone, a wearable device, a server, an electric vehicle, home applications, or the like.

Referring to FIG. 13, the system 1000 may be roughly divided into a host device 1100 and a computation storage device CSD 1200.

The host device 1100 may perform various arithmetic/logical operations for the purpose of controlling overall operations of the system 1000. The host device 1100 may include a central processing unit (CPU) 1110, a graphic processing unit (GPU) 1130, a host memory 1150, a network interface card (NIC) 1170, and an interface circuit 1190. Alternatively, the host device 1100 may be a device which includes one or more processor cores, such as for example a general-purpose CPU, a dedicated application specific integrated circuit (ASIC), or an application processor.

The central processing unit 1110 executes a variety of software (e.g., an application program, an operating system, and a device driver) loaded onto the host memory 1150. The central processing unit 1110 may execute an operating system (OS) and application programs. The central processing unit 1110 may be implemented for example with a homogeneous multi-core processor or a heterogeneous multi-core processor. In particular, the central processing unit 1110 may request the computation storage device 1200 to process a data intensive work load operation such as data compression, data encryption, data processing, or the like.

The graphics processing unit 1130 performs various graphic operations in response to a request of the central processing unit 1110. That is, the graphics processing unit 1130 may convert process-requested data to data suitable for display. A streaming access to the computation storage device 1200 may also be requested by the graphics processing unit 1130. The graphics processing unit 1130 has an operation structure that is suitable for parallel processing in which similar operations are repeatedly processed. Accordingly, graphics processing units such as graphics processing unit 1130 are currently being developed to have a structure that may be used to perform various operations requiring high-speed parallel processing as well as graphic operations. For example, the graphics processing unit 1130 that processes a general-purpose operation as well as a graphic processing operation is called a general purpose computing on graphics processing units (GPGPU). The GPGPU may for example be used to analyze a molecular structure, to decrypt a code, or to predict a meteorological change in addition to video decoding.

The host memory 1150 may store data that are used to operate the system 1000. For example, the host memory 1150 may store data processed or to be processed by the host device 1100. The host memory 1150 may include volatile/nonvolatile memory such as for example static random access memory (SRAM), dynamic RAM (DRAM), synchronous DRAM (SDRAM), phase-change RAM (PRAM), ferro-electric RAM (FRAM), magneto-resistive RAM (MRAM), and resistive RAM (ReRAM).

The network interface card 1170 is a communication interface for connecting an Ethernet switch or an Ethernet fabric with the system 1000. For example, in the case where the Ethernet switch corresponds to a wired LAN network, the network interface card 1170 may be implemented with a wired LAN card. Of course, even in the case where the Ethernet switch is a wireless LAN, the network interface card 1170 may be implemented with hardware that processes a communication protocol corresponding to the wireless LAN.

The interface circuit 1190 provides a physical connection between the host device 1100 and the computation storage device 1200. That is, the interface circuit 1190 may convert a command, an address, data, or the like. which correspond to various access requests generated from the host device 1100, so to be suitable for an interface manner with the computation storage device 1200. The interface circuit 1190 may be configured according to any of a variety of different communication protocols such as for example Universal Serial Bus (USB), Small Computer System Interface (SCSI), Peripheral Component Interface express (PCIe), Advanced Technology Attachment (ATA), parallel ATA (PATA), serial ATA (SATA), serial attached SCSI (SAS), and universal flash storage (UFS).

The computation storage device 1200 may store data regardless of whether power is supplied. For example, the computation storage device 1200 may include storage mediums such as for example solid-state drives (SSDs), secure digital (SD) cards, embedded multimedia cards (eMMC), or the like. In an embodiment, the computation storage device 1200 may include a field-programmable gate array (FPGA) 1210 corresponding to the above-described computing device and an SSD 1230 corresponding to the above-described storage device.

The FPGA 1210 may access the SSD 1230 in response to a request from the host device 1100. For example, the FPGA 1210 may transfer a streaming access command to the SSD 1230 in response to a data request from the host device 1100. The streaming access command may include information of a logical block address (LBA) list, a stream identifier (ID), a chunk size, a priority, or the like. The computation storage device 1200 including the FPGA 1210 and the SSD 1230 may be referred to as a smart SSD or a computational SSD.

The FPGA 1210 may process within the computation storage device 1200 stream data provided from the SSD 1230 in response to the streaming access command. Result data processed by the FPGA 1210 may be returned to the host device 1100. The above operation of the FPGA 1210 may make it possible to markedly improve (or minimize) a decrease in a bandwidth due to the exchange of stream data between the computation storage device 1200 and the host device 1100.

The SSD 1230 stores or outputs data in response to a request provided from the host device 1100 or the FPGA 1210. The SSD 1230 may provide stream data in units of a requested data size in response to the streaming access command (e.g., a streaming read command or a streaming write command). For example, in the case where requested data are stored in a buffer (not illustrated), the SSD 1230 may allow a DMA engine (not illustrated) of the FPGA 1210 to sequentially read data stored in the buffer.

In an embodiment, the computation storage device 1200 may be a removable device that may be selectively connected to an electronic device including the host device 1100. For example, the host device 1100 may be mounted on a main board of the electronic system and the computation storage device 1200 may be attached to a socket of the electronic device where the computation storage device 1200 may be electrically connected to the host device 1100.

In an embodiment, the computation storage device 1200 may be an embedded device that is integrated together with the host device 1100 in the electronic device. In this case, the computation storage device 1200 may be electrically connected to the host device 1100 through an internal system bus of the electronic device.

Figure 14:
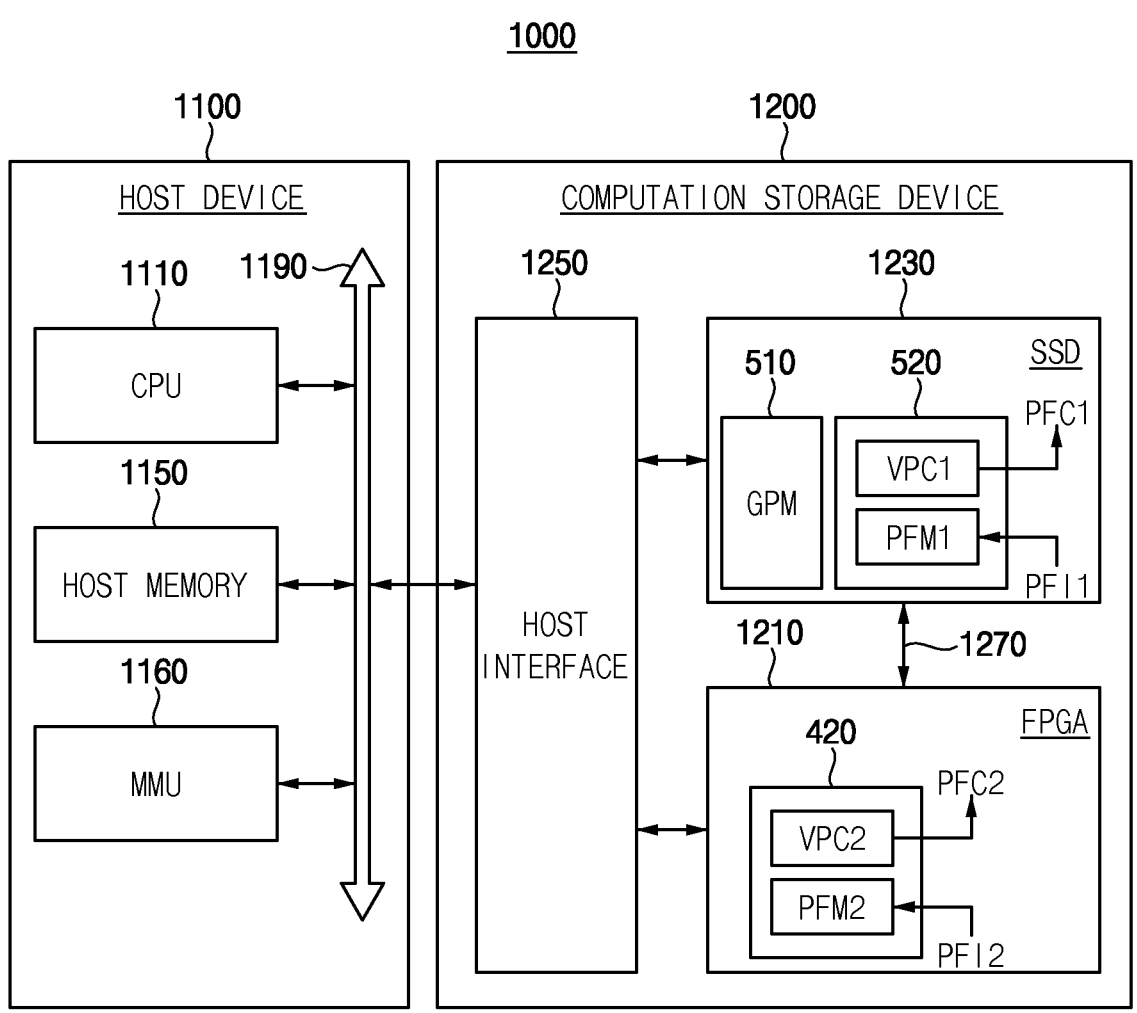
FIG. 14 is a block diagram illustrating an example configuration of the system of FIG. 13.

FIG. 14 illustrates an example configuration of the system of FIG. 13.

Referring to FIG. 14, the host device 1100 and computation storage device 1200 constitute the system 1000.

The host device 1100 may include the central processing unit CPU 1110, the host memory 1150, the interface circuit 1190, and a memory management unit MMU 1160. It should be understood that the host device 1100 further includes components such as the graphics processing unit 1130 and the network interface card 1170. However, for convenience of description, some functions of the components of the host device 1100 need not be here described and/or some of the components need not be illustrated. Substantially duplicate description may be omitted. The central processing unit 1110, the host memory 1150, and the interface circuit 1190 are substantially the same as those of FIG. 11, and thus, additional description may be omitted to avoid redundancy.

The host device 1100 may map a buffer (e.g., 1235 in FIG. 1) of the SSD 1230 onto a virtual memory space of the host device 1100. In general, a storage device such as the SSD 1230 does not open the buffer 1235, which is a memory space for direct memory access (DMA), for any other device. Accordingly, the host device 1100 may register the buffer 1235 at a virtual memory space to manage the buffer 1235 through one map, and thus, the buffer 1235 may be freely accessible by a DMA engine of the FPGA 1210. To this end, the host device 1100 may include the memory management unit 1160. During booting or initialization of the system 1000, the buffer 1235 may be opened to an external device for transmission of stream data by mapping a physical address region of the buffer 1235 of the SSD 1230 onto a virtual memory space. An access of an external device to the virtual memory space may be redirected to the buffer 1235 by the memory management unit 1160.

The computation storage device 1200 processes data provided from the host device 1100 or the SSD 1230 in an in-storage computing manner in response to a request of the host device 1100. The computation storage device 1200 may return a result of the in-storage computing to the host device 1100. To this end, the computation storage device 1200 may include the FPGA 1210, the SSD 1230, and a host interface 1250.

The host interface 1250 is provided as a physical communication channel of the computation storage device 1200, which is used for data exchange with the host device 1100. The host interface 1250 may have an interfacing protocol supporting DMA functions of the FPGA 1210 and the SSD 1230. For example, the buffer 1235 of the SSD 1230 may be managed in the virtual memory space by the memory management unit 1160 of the host device 1100 and the host interface 1250.

The SSD 1230 and the FPGA 1210 may be connected directly through an internal bus 1270. For example, the internal bus 1270 may be an inter-integrated circuit (I2C) bus.

The SSD 1230 may store data and receive power through a power rail connected to the host device 1100. The FPGA 1210 may process data read from the SSD 1230 or data to be stored in the SSD 1230 and receive power through the power rail.

The SSD 1230 may include a global power manager GPM 510 and a storage power manager SPM 520. The FPGA 1210 may include a computing power manager CPM 420.

The storage power manager SPM may include a storage variable performance controller VPC1 and a storage performance monitor PFM1. As described above, the storage variable performance controller VPC1 may generate the storage performance control value PFC1, based on the storage target power value TP1 provided form the global power manager 510. The storage performance monitor PFM1 may periodically generate and provide the storage power demand value DP1 based on storage performance information PFI1.

The computing power manager CPM may include a computing variable performance controller VPC2 and a computing performance monitor PFM2. As described above, the computing variable performance VPC2 may generate the computing performance control value PFC2, based on the computing target power value TP2 provided form the global power manager 510. The computing performance monitor PFM2 may periodically generate and provide the computing power demand value DP2 based on computing performance information PFI2.

The computing target power value TP2 generated from the global power manager 510 may be provided to the FPGA 1210 through the internal bus 1270, and the computing power demand value DP2 generated in the FIGA 1210 may be provided to the global power manager 510 through the internal bus 1270.

FIG. 14 illustrates that the global power manager 510 is included in the SSD 1230, but embodiments are not limited thereto. According to an embodiment, the global power manager 510 may be disposed in the FPGA 1210 or the hoar interface 1250. In an embodiment, the global power manager 510 may be included in the host device 1100.

Even though not illustrated in FIG. 14, the computation storage device 1200 may further include various elements. For example, the computation storage device 1200 may include a power management integrated circuit (PMIC) to control overall power of the computation storage device 1200, a clock generator to control an operation frequency of a clock signal of the computation storage device 1200, a voltage regulator to control an operation voltage of the computation storage device 1200, or the like. For control of the power and/or the performance of the computation storage device 1200, the storage performance control value PFC1 from the storage power manager 520 and the computing performance control value PFC2 from the computing power manager 420 may be provided to the PMIC, the clock generator and/or the voltage regulator.

Figure 15:
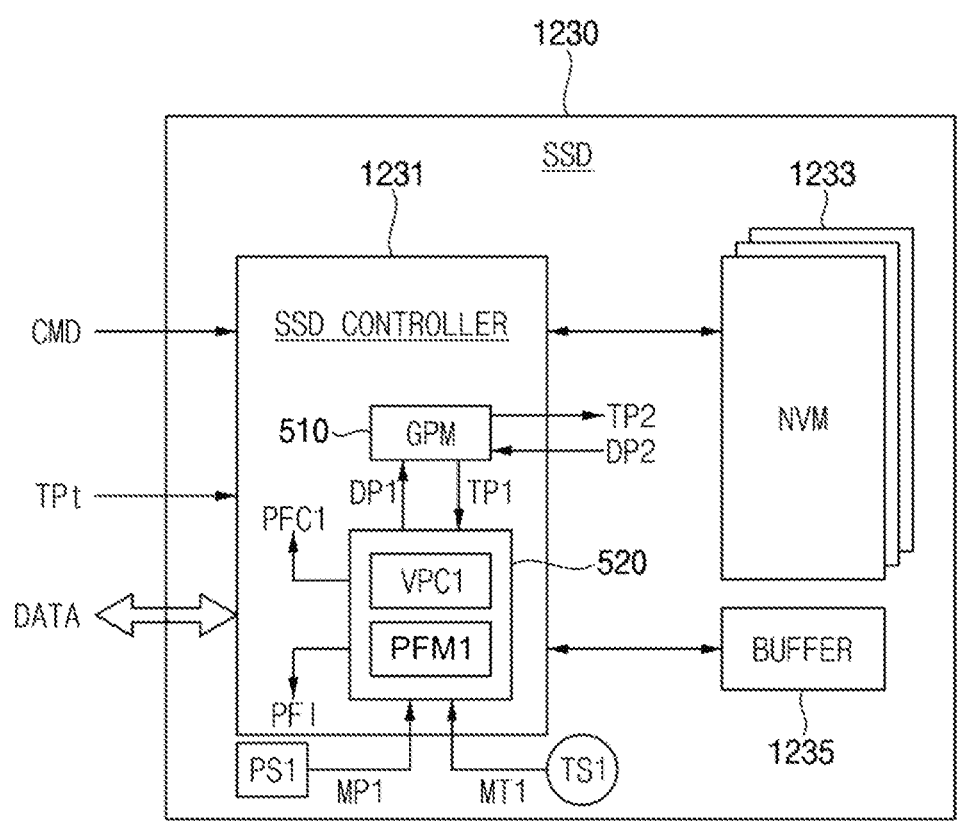
FIG. 15 is a block diagram illustrating a storage device included in a computation storage device according to an embodiment.

FIG. 15 illustrates an example embodiment of a storage device included in a computation storage device according to an embodiment.

Referring to FIG. 15, the SSD 1230 may include an SSD controller 1231, a nonvolatile memory device(s) 1233, and a buffer 1235.

The SSD controller 1231 may provide interfacing between an external device and the SSD 1230. The SSD controller 1231 accesses the nonvolatile memory device 1233 with reference to a stream ID, an LBA list, and a chunk size included in the streaming access command provided from the outside. For example, in the case where the streaming access command corresponds to a read command, the SSD controller 1231 prefetches data corresponding to the LBA list from the nonvolatile memory device 1233 in a unit of the chunk size and loads the prefetched data onto the buffer 1235. In contrast, in the case where the streaming access command corresponds to a write command, the SSD controller 1231 may program write data (DATA) loaded onto the buffer 1235 from the outside in the unit of the chunk size in the nonvolatile memory device 1233. In an embodiment, the SSD 1230 may further include the storage power sensor PS1 configured to generate the measured storage power value MP1 corresponding to the performance of the SSD 1230 and the storage temperature sensor TS1 configured to generate the storage temperature value MT1 by measuring an operation temperature of the SSD 1230.

The global power manager GPM 510 may periodically generate the storage target power value TP1 indicating the power limit of the SSD 1230 and the computing target power value TP2 indicating the power limit of the FPGA 1210 based on the total target power value TPt indicating the power limit of the entire computation storage device 1200, the storage power demand value DP1 and the computing power demand value DP2. The total target power value TPt may be provided from the host device 1100.

Figure 16:
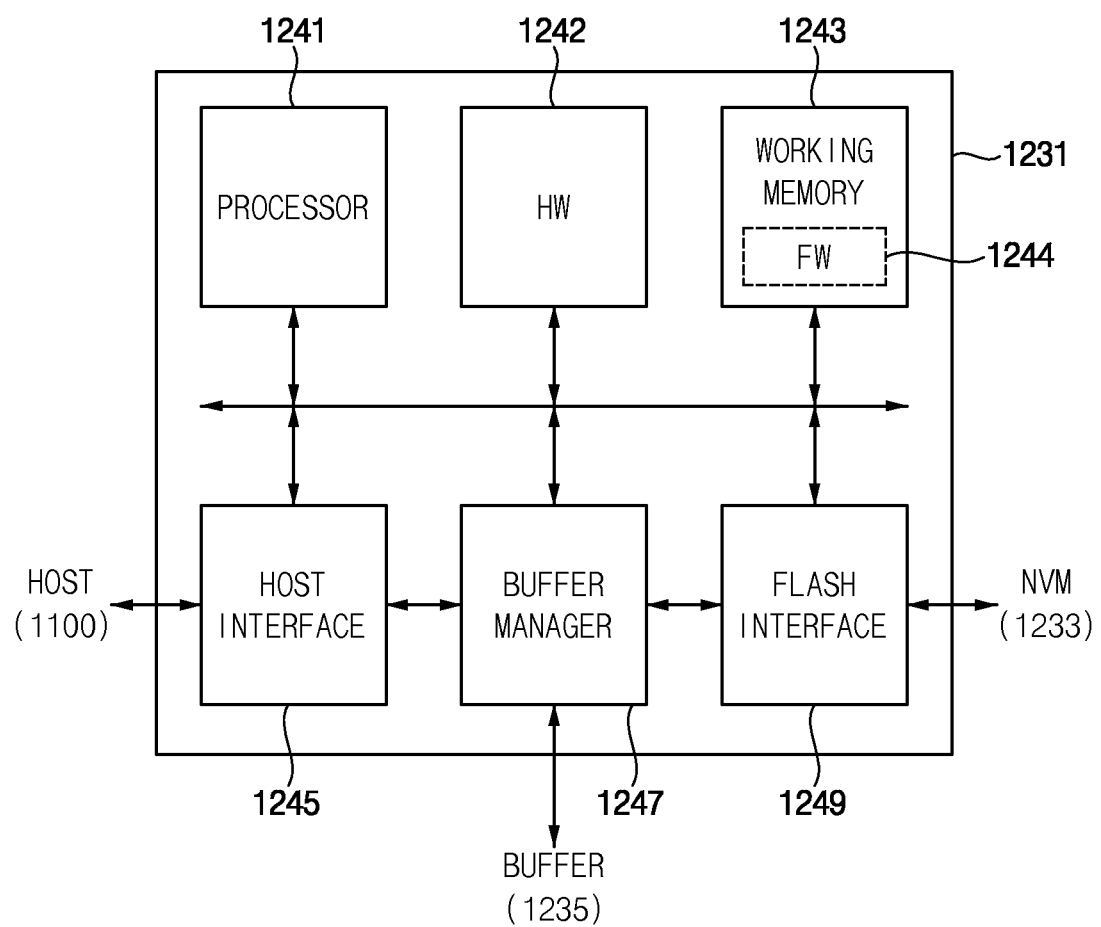
FIG. 16 is a block diagram illustrating a storage controller included in the storage device of FIG. 15.

FIG. 16 illustrates an example embodiment of a storage controller included in the storage device of FIG. 15.

Referring to FIG. 16, the SSD controller 1231 may include a processor 1241, a hardware HW 1242, a working memory 1243, a host interface 1245, a buffer manager 1247, and a flash interface 1249. According to an embodiment, the global power manager 510 and the storage power manager 520 may be implemented with the firmware FW 1244, the hardware 1242 or a combination thereof. Even though not illustrated in FIG. 16, the SSD controller 1231 may further include a PMIC to control overall power of the computation storage device 1200. In this case, the computing performance control value PFC2 generated from the FPGA 1210 in FIG. 14 may be provided to the PMIC in the SSD controller 1231 through the internal bus 1270.

The processor 1241 may execute the firmware 1244 loaded onto the working memory 1243. As the firmware 1244 is executed, the processor 1241 may transfer various control information necessary to perform a read/write operation to registers of the host interface 1245 and flash interface 1249. For example, in the case where the streaming access command is received from the outside, the streaming access command is stored in a command register (not illustrated) of the host interface 1245. The host interface 1245 may notify the processor 1241 that the read/write command is input to the processor 1241, based on the stored command. The processor 1241 may parse the streaming access command transferred to the host interface 1245 to control the buffer manager 1247 and the flash interface 1249.

The working memory 1243 may store data that are used to drive the SSD controller 1231. For example, various firmware 1244 to be executed by the SSD controller 1231 may be loaded onto the working memory 1243. For example, a flash translation layer (FTL) to be executed by the processor 1241 or a firmware image such as the global power manager 510 and the storage power manager 520 according to an embodiment may be loaded onto the working memory 1243 and may be executed by the processor 1241.

The host interface 1245 provides a physical connection between the host device 1100 or an external device and the SSD 1230. That is, the host interface 1245 provides interfacing with the SSD 1230, which complies with a bus format of the host device 1100. The bus format of the host device 1100 may include for example at least one of Universal Serial Bus (USB), Small Computer System Interface (SCSI), Peripheral Component Interface express (PCIe), Advanced Technology Attachment (ATA), parallel ATA (PATA), serial ATA (SATA), a serial attached SCSI (SAS), Non-Volatile Memory Host Controller Interface Specification (NVMHCIS) or Non-Volatile Memory Express (NVMe), and/or NVMe over Fabrics (NVMe-oF).

The flash interface 1249 exchanges data with the nonvolatile memory device 1233. The flash interface 1249 writes data transferred from the buffer 1235 in the nonvolatile memory device 1233. The flash interface 129 may transfer the data read from the nonvolatile memory device 1233 to the buffer 1235.

Figure 17:
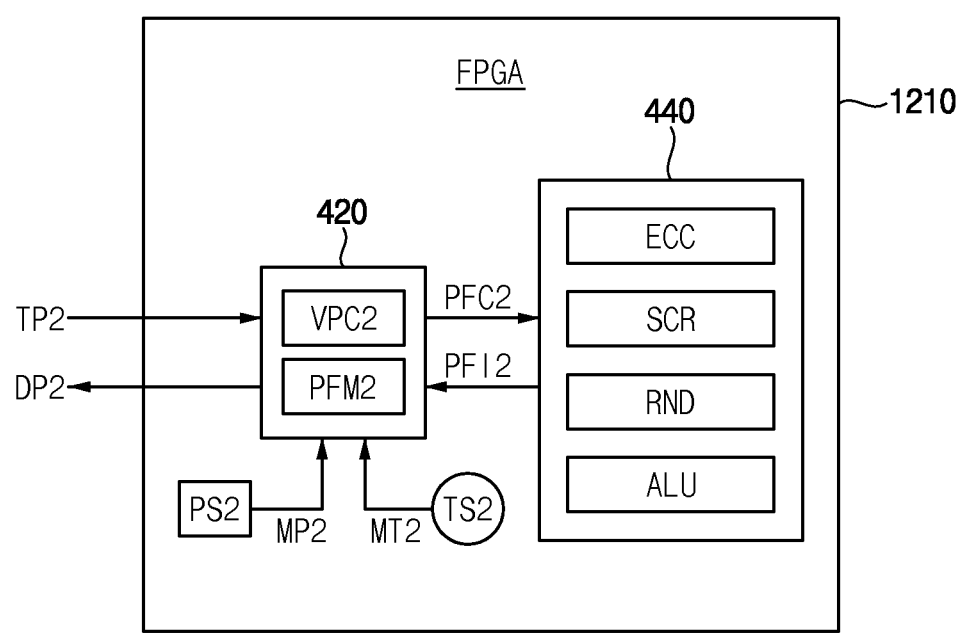
FIG. 17 is a block diagram illustrating a computing device included in a computation storage device according to an embodiment.

FIG. 17 illustrates an example embodiment of a computing device included in a computation storage device according to an embodiment.

Referring to FIG. 17, the FPGA 1210 may include the computing power manager 420 and a processing unit 440.

The computing power manager 420 may include the computing variable performance controller VPC2 and the computing performance monitor PFM2. The computing variable performance VPC2 may generate the computing performance control value PFC2, based on the computing target power value TP2 provided form the global power manager 510 and the measured computing power value MP2 provided from the computing power sensor PS2. FIG. 17 illustrates that the computing performance control value PFC2 is provided to the processing unit 440, but embodiments are not limited thereto. As described above, the computing performance control value PFC2 may be provided to the PMIC configured to control overall power of the computation storage device.

In an embodiment, the FPGA 1230 may further include the computing temperature sensor TS2 configured to generate a computing device temperature value MS2 by measuring the operation temperature of the FPGA 1210. The computing performance monitor PFM2 may periodically generate and provide the computing power demand value DP2 based on computing performance information PFI2 provided from the processing unit 440.

The processing unit 440 may be implemented to perform various functions. For example, the processing unit 440 may include an error correction code engine ECC to perform encoding and decoding of data, a security circuit SCR to perform encryption and decryption of data, a randomizer RND to perform randomizing of data, an arithmetic logic unit ALU to perform computation of data, or the like.

Figure 18:
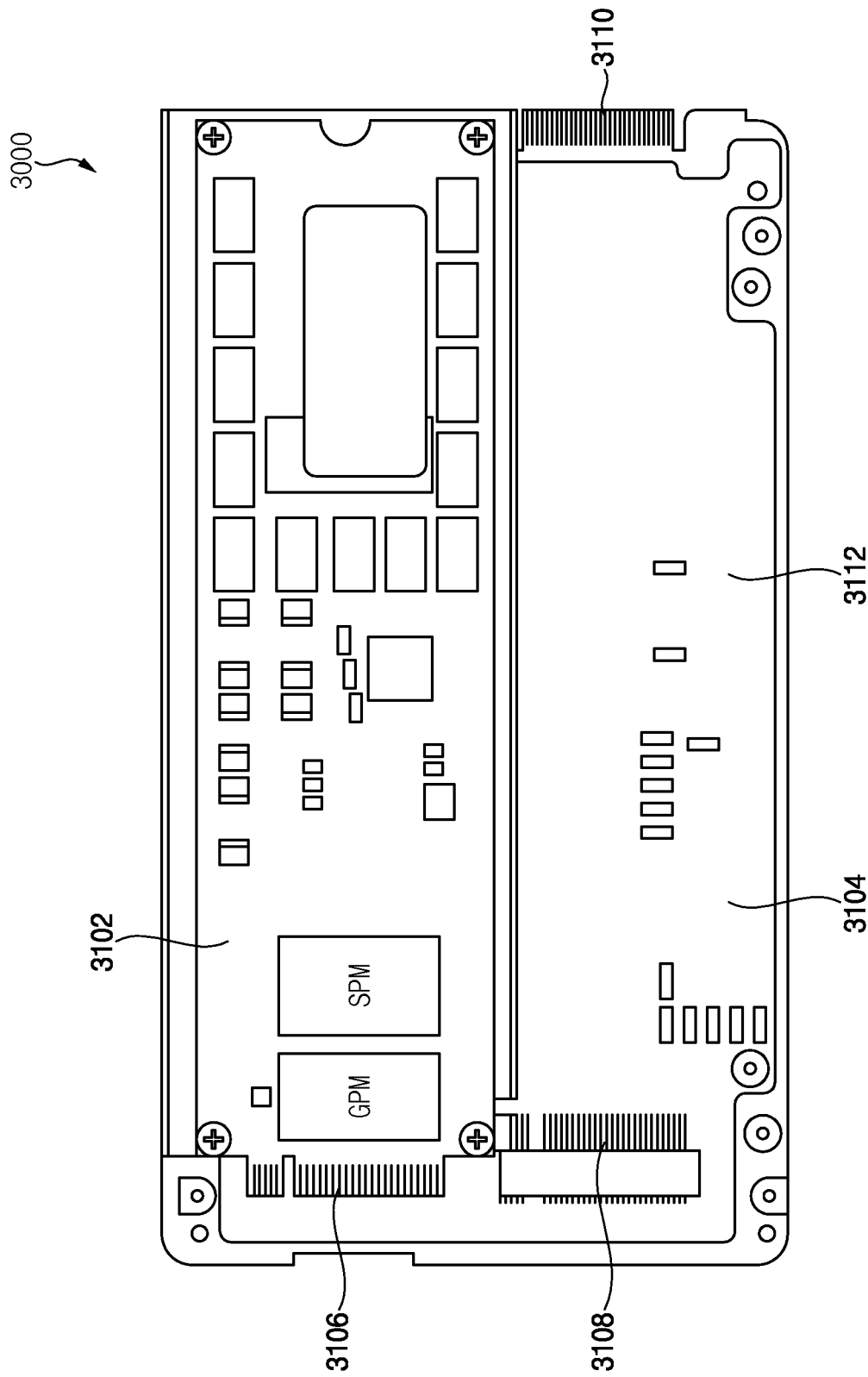
FIG. 18 is a plan view diagram illustrating a computation storage device according to an embodiment.

FIGS. 18 and 19 illustrate a computation storage device according to an embodiment.

A computation storage device 3000 of FIG. 18 may include at least one SSD 3102, an FPGA printed-circuit board (PCB) 3104, at least two standard SSD connectors such as M.2 3106 and 3108, and at least one U.2 connector 3110. The at least two M.2 connectors 3106 and 3108 may be vertical or 90 degree connectors to connect one or more SSDs (e.g., 3102) to the FPGA PCB 3104. The vertical M.2 connectors 3106 and 3108 are perpendicular with respect to a first side (e.g., a top side in FIG. 18) 3112 of the FPGA PCB 3104. The at least one SSD 3102 may be a 2.5-inch storage form factor, a new form factor 1 (NF1) SSD, or the like. The at least one SSD 3102 is connected to the FPGA PCB 3104 at the first side 3112 of the FPGA PCB 3104 via the vertical M.2 connector 3106.

In an embodiment, the computation storage device 3000 may support, via the U.2 connector 3110, a plurality of SAS ports (e.g., SAS0 and SAS1) and up to four PCIe X4 lanes. The two SAS ports (SAS0 and SAS1) may be used as Ethernet ports by the computation storage device 3000.

In an embodiment, an FPGA (shown, for example, in FIG. 19) may be connected to the FPGA PCB 3104 in a second side opposite to the first side 3112 of the FPGA PCB 3104 to which the at least one SSD 3102 is connected via the vertical M.2 connector 3106. In an example configuration, when the storage device 3000 is placed in a housing case, one or more layers of thermal interface material (TIM) may be placed between the housing case and the storage device 3000. In an embodiment, the length of the FPGA PCB 3104 may be equal to or longer than a length of the at least one SSD 3102 and the FPGA.

FIG. 19 illustrates a cross-sectional view of a storage device 4000 in a housing case 4202. The storage device 4000 may be the storage device 3000 of FIG. 18. The storage device 4000 includes the housing case 4202, a first TIM layer 4240, at least one NF1 SSD 4204, at least one vertical M.2 connector 4210, a plastic or metal support or standoff 4212, an FPGA PCB 4216, an FPGA 4222, a second TIM layer 4236, and a standard SSD connector such as a U.2 connector 4214.

In the example embodiment of FIG. 19, a first side 4246 of the first TIM layer 4240 is attached to (or in thermal contact with) a first side 4242 of the metal or thermal conductive housing case 4202. A second side 4248 of the first TIM layer 4240 is attached to (or in thermal contact with) a first side 4224 of the SSD 4204. The SSD 4204 is connected to the FPGA PCB 4216 via the vertical M.2 connector 4210, which is attached and electrically connected to the SSD 4204 at the second side 4206 of the SSD 4204. The vertical M.2 connector 4210 is mounted on the FPGA PCB 4216. In an embodiment, the vertical M.2 connector 4210 and the FPGA PCB 4216 are separated by an air gap.

In an embodiment, a plastic (or other suitable insulating material) support or standoff 4212, that provides structural support to the SSD 4204, may be located between a third side 4230 of the FPGA PCB 4216 and the third side 4226 of the SSD 4204. The plastic support or standoff 4212 may be located adjacent to the fourth side 4220 of the FPGA PCB 4216 and the fourth side 4208 of the SSD 4204.

In an embodiment, the U.2 connector 4214 is mounted on and electrically connected to the FPGA PCB 4216. In an example configuration, the storage device 4000 may support, via the U.2 connector 4214, a plurality of SAS ports such as SAS0 and SAS1 and up to four PCIe X4 lanes of a PCIe X4 bus. The two SAS ports SAS0 and SAS1 may be used as Ethernet ports by the storage device 4000.

In the storage device 4000 of FIG. 19, the third side 4230 of the FPGA PCB 4216 is attached to a first side 4232 of the FPGA 4222. In an embodiment, the FPGA 4222 may be mounted on the third side 4230 of the FPGA PCB 4216 and electrically connected to the FPGA PCB 4216. A second side 4234 of the FPGA 4222 is attached to (or in thermal contact with) the second TIM layer 4236 at a first side 4250 of the second TIM layer 4236. A second side 4252 of the second TIM layer 4236 is either attached to, or in thermal contact with, the second side 4244 of the housing case 4202. The first TIM layer 4240 and the second TIM layer 4236 may be used to spread and dissipate the heat generated by the electronic devices such as the SSD 4204 and by the FPGA 4222 during the normal operation of the SSD 4204 and the FPGA 4222, to prevent overheating of the storage device 4000 by transferring the generated heat to outside of the storage device 4000 via the housing case 4202. In an embodiment, the length of the second TIM layer 4236 may be equal to or longer than the length of the FPGA 4222.

The SSD 4204 may include a global power manager GPM and a storage power manager SPM, and the FPGA 4222 may include a computing power manager CPM. A PMIC may be disposed in the SSD 4204. The performance control values generated by the storage power manager SPM and the computing power manager CPM may be provided to the PMIC.

The method of managing power as described with reference to FIGS. 1 through 19 may be applied to an arbitrary system including a plurality of components requiring performance balance between the components. Hereinafter, an embodiment of a multi-component device are described with reference to FIGS. 20 and 21.

Figure 20:
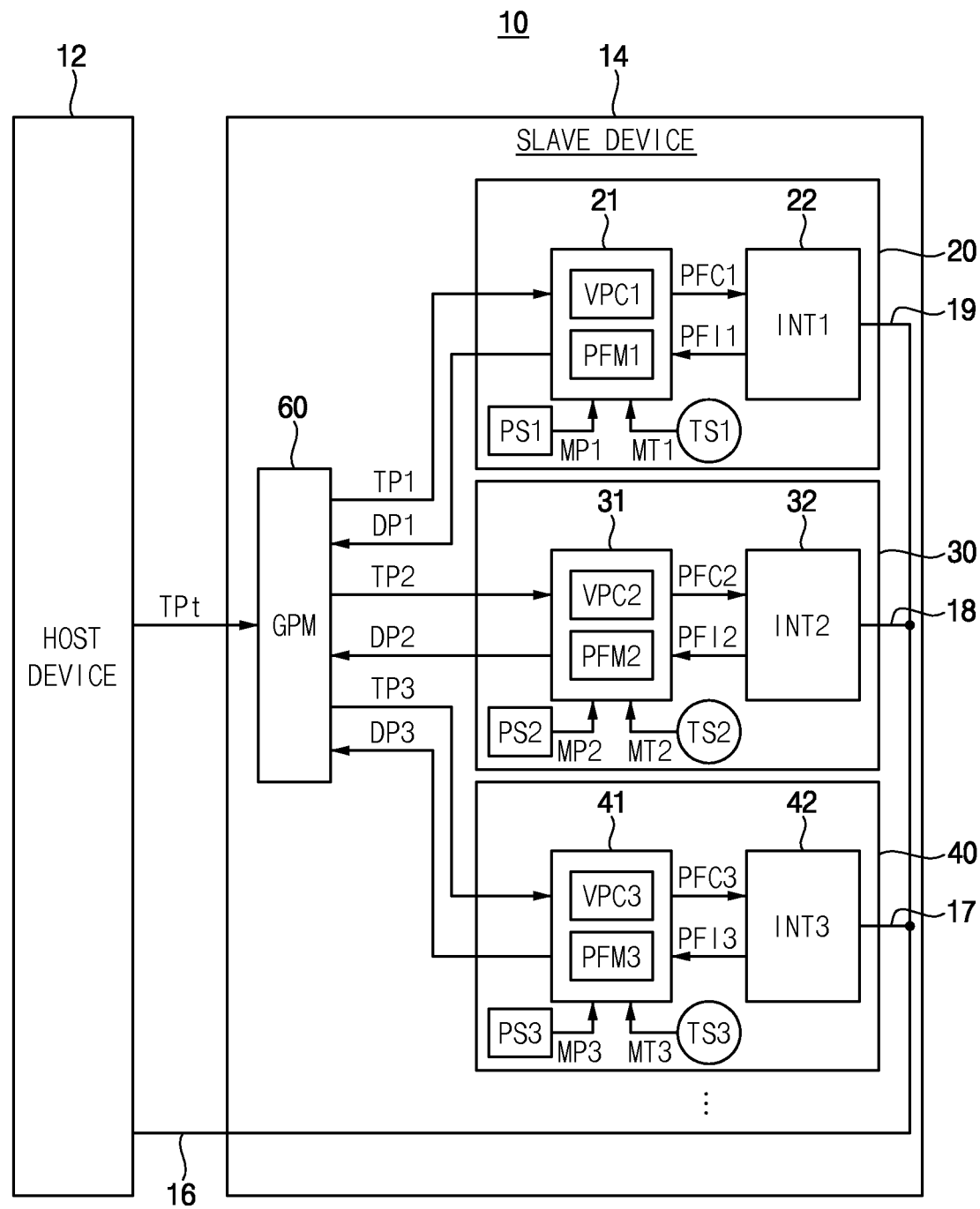
FIG. 20 is a block diagram illustrating a system including a multi-component device according to an embodiment.
Figure 21:
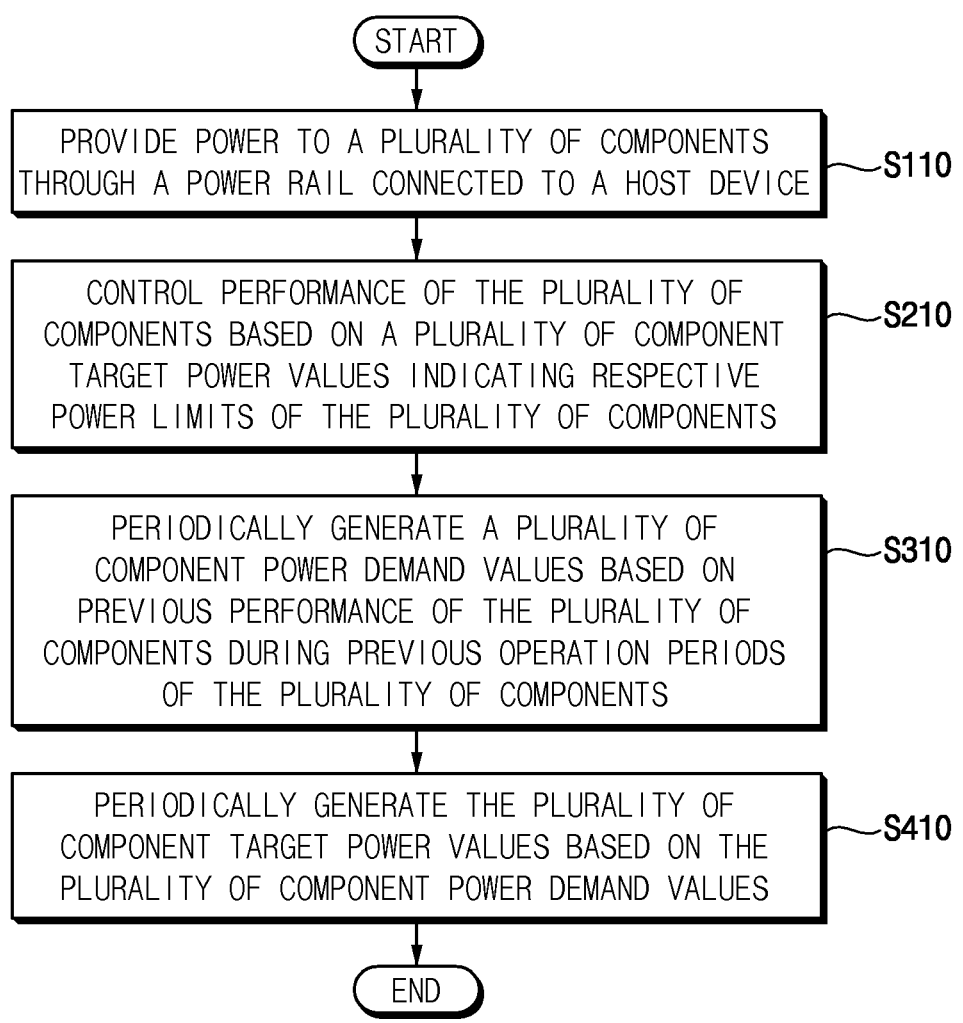
FIG. 21 is a flowchart diagram illustrating a method of managing power of a multi-component device according to an embodiment.

FIG. 20 illustrates a system including a multi-component device according to an embodiment, and FIG. 21 illustrates a method of managing power of a multi-component device according to an embodiment.

Referring to FIG. 20, a system 10 includes a host device 12 and a slave device 14. The slave device 14 may be controlled by the host device 12 to provide a service corresponding to a request from the host device 12. For example, the slave device 14 may store data transferred from the host device 12 and/or process data from the host device 12 or data stored in the slave device 14, in response to the request from the host device 12.

The slave device 14 or a multi-component device 14 may include a plurality of components 20, 30 and 40, and a global power manager GPM 60.

The components 20, 30 and 40 may receive power from the host device 12 through a power rail 16 connected to the host device 12. The power provided through the power rail 16 may be distributed to the components 20, 30 and 40 through internal wirings 17, 18 and 19. FIG. 20 illustrates the three components 20, 30 and 40 for convenience of illustration and description, but the multi-component device 14 may include two, four or more components. In this disclosure, "a component" indicates a unit configuration such that performance and power may be controlled per individual component.

Each of the components 20, 30 and 40 may include an internal circuit configured to perform its own function and a component power manager configured to control performance and power of the internal circuit. For example, the first component 20 may include a first component power manager 21 and a first internal circuit INT1 22, the second component 30 may include a second component power manager 31 and a second internal circuit INT2 32, and the third component 40 may include a third component power manager 41 and a third internal circuit INT3 42.

Referring to FIGS. 20 and 21, power may be provided to the plurality of components 20, 30 and 40 through the power rail 16 connected to a host device 12 at step S110.

A plurality of variable performance controllers VPC1, VPC2 and VPC3 in the plurality of component power managers 21, 31 and 41 may control performance of the plurality of components 20, 30 and 40 based on a plurality of component target power values TP1, TP2 and TP3 indicating respective power limits of the plurality of components 20, 30 and 40 at step S210.

A plurality of performance monitors PFM1, PFM2 and PFM3 in the plurality of component power managers 21, 31 and 41 may periodically generate a plurality of component power demand values DP1, DP2 and DP3 based on previous performance of the plurality of components 20, 30 and 40 during previous operation periods of the plurality of components 20, 30 and 40 at step S310.

The global power manager 60 may periodically generate the plurality of component target power values TP1, TP2 and TP3 based on the plurality of component power demand values DP1, DP2 and DP3 at step S410.

Each of the first, second and third component power managers 21, 31 and 41 may include a variable performance controller and a performance monitor. The first component power manager 21 may include a first variable performance controller VPC1 and a first performance monitor PFM1, the second component power manager 31 may include a second variable performance controller VPC2 and a second performance monitor PFM2, and the third component power manager 41 may include a third variable performance controller VPC3 and a third performance monitor PFM3, Each variable performance controller VPCi (i=1, 2, 3) may generate a performance control value PFCi to control power and performance of each internal circuit INTi based on a target power value TPi provided form the global power manager 60. Each internal circuit INTi may control the performance of each component based on the performance control value PFCi such that the power consumption of each component need not exceed the power corresponding to the storage target power value TPi. Example embodiments of the variable performance controller VPC1 are described above with reference to FIGS. 9, 10 and 11.

Each performance monitor PFM1 may generate a power demand value DPi indicating previous performance of each component during the previous operation period of each component based on performance information PFIi provided from each internal circuit INTi. Example embodiments of generating the storage power demand value DPi are described above with reference to FIGS. 4 through 8.

FIG. 20 illustrates that the global power manager 60 is disposed outside the plurality of components 20, 30 and 40, but embodiments are not limited thereto. According to an embodiment, the global power manager 60 may be included in one of the plurality of components 20, 30 and 40 or in the host device 12.

In an embodiment, each of the components 20, 30 and 40 may further include a power sensor PSi configured to generate a measured power value MPi by measuring the power consumption of each component and/or a temperature sensor TSi configured to generate an operation temperature value MTi by measuring the operation temperature of each component.

Figure 22:
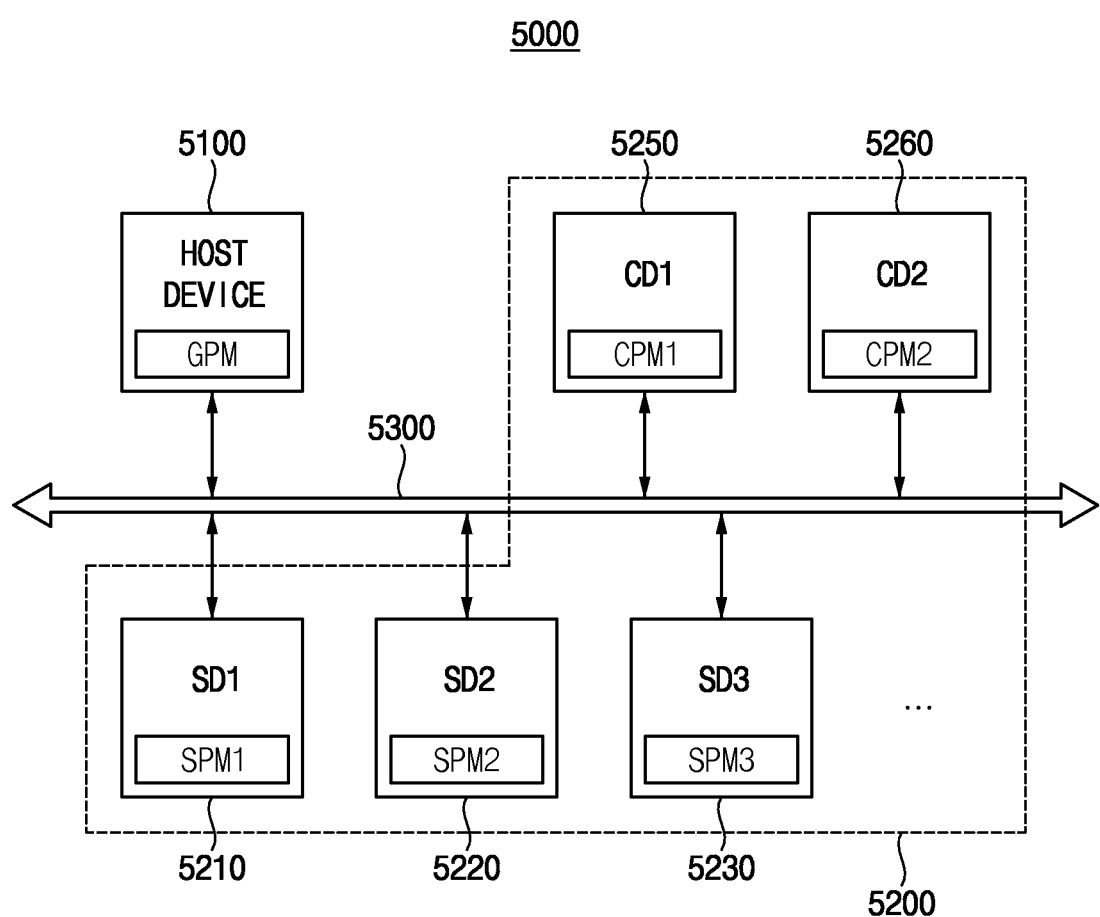
FIG. 22 is a block diagram illustrating a system according to an embodiment.

FIG. 22 illustrates a system according to an embodiment.

Referring to FIG. 22, a system 5000 may include a host device 5100, a plurality of storage devices SD1 5210, SD2 5220 and SD3 5230 and one or more computing devices CD1 5250 and CD2 5260.

The storage devices 5210, 5220 and 5230 and the computing devices 5250 and 5260 may constitute a multi-component device 5200 as described with reference to FIGS. 20 and 21. The storage devices 5210, 5220 and 5230 may include storage power managers SPM1, SPM2 and SPM3 as described above, and the computing devices 5250 and 5260 may include computing power manager2 CPM1 and CPM2 as described above. In an embodiment, a global power manager GPM as described above may be included in the host device 5100.

The computation storage device and the multi-component device described with reference to FIGS. 1 through 21 may be implemented as a single package. In contrast, in the multi-component device 5200 of FIG. 22, the storage devices 5210, 5220 and 5230 and the computing devices 5250 and 5260 may be implemented as respective packages and connected through an interface circuit 5300 such as a PCIe. The computing device 5250 and 5260 may communicate with the storage devices 5210, 5220 and 5230 through point-to-point communication without intervention of the host device 5100. As such, the method of managing power according to an embodiment may be applied to an array of storage devices.

As described above, the computation storage device, the multi-component device and the method of managing power according to an embodiment may efficiently implement performance balance between the plurality of components and meet the power limit by monitoring the performance of each component to periodically generate the power demand values and distributing the permitted power to the plurality of components based on the power demand values.

As will be appreciated by one skilled in the art, an embodiment may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any non-transitory or tangible medium that can contain, or store a program for use by or in connection with an instruction execution system, apparatus, or device.

The teachings of the present disclosure may be applied to any relevant electronic devices and/or systems. For example, the disclosure may be applied to systems such as a memory card, a solid-state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, an automotive driving system, a server system, or the like.

The foregoing is illustrative of the inventive concept and is not to be construed as limiting thereof. Although illustrative embodiments have been described by way of example, those of ordinary skill in the pertinent art will readily appreciate that many modifications are possible in these and other embodiments without materially departing from the scope or spirit of the present disclosure.

What is claimed is:

1. A computation storage device comprising:
a storage device configured to receive a first controlled power, store data, and read the stored data, the storage device including a storage power manager configured to periodically generate a storage power demand value based on previous performance of the storage device during a previous operation period of the storage device;
a computing device configured to receive a second controlled power, and perform computations on data to be stored in the storage device or on data read from the storage device, the computing device including a computing power manager configured to periodically generate a computing power demand value based on previous performance of the computing device during a previous operation period of the computing device; and
a global power manager configured to periodically generate a storage target power value indicative of a next power limit for the storage device and a computing target power value indicative of a next power limit for the computing device, based on both of the storage power demand value and the computing power demand value,
wherein the storage power manager is configured to provide the first controlled power to the storage device based on the storage target power value,
wherein the computing power manager is configured to provide the second controlled power to the computing device based on the computing target power value,
wherein the storage power demand value is periodically generated based on a ratio of performance of the storage device during the previous operation period with respect to a maximum performance of the storage device, a ratio of read operations performed by the storage device during the previous operation period with respect to the read operations and write operations performed by the storage device during the previous operation period, a weight constant value of the write operations with respect to the read operations, and a ratio of data input-output operations performed by the storage device according to requests from the host device with respect to entire operations performed by the storage device during the previous operation period.

2. The computation storage device of claim 1, further comprising:
a power rail, connectable to a host device to receive a total power, connected to the storage device for providing the first controlled power, and connected to the computing device for providing the second controlled power,
wherein the global power manager determines the storage target power value and the computing target power value by dividing an entire target power value indicating a power limit of the computation storage device based on the storage power demand value and the computing power demand value.

3. The computation storage device of claim 1,
wherein the global power manager determines the storage target power value and the computing target power value based on the storage power demand value that is generated most recently by the storage power manager and the computing power demand value that is generated most recently by the computing power manager.

4. The computation storage device of claim 1,
wherein the global power manager determines the storage target power value and the computing target power value based on following expressions:

$$TP1=TPt\times(DP1/(DP1+DP2));$$

$$TP2=TPt\times(DP2/(DP1+DP2)),$$

wherein TPt indicates an entire target power value indicating a power limit of the computation storage device, TP1 indicates the storage target power value, TP2 indicates the computing target power value, DP1 indicates the storage power demand value, and DP2 indicates the computing power demand value.

5. The computation storage device of claim 1,
wherein the storage power manager determines the storage power demand value based on a ratio of performance of the storage device during the previous operation period with respect to a maximum performance of the storage device.

6. The computation storage device of claim 1,
wherein the storage power manager determines the storage power demand value based on a ratio of write operations performed by the storage device during the previous operation period and read operations performed by the storage device during the previous operation period.

7. The computation storage device of claim 1,
wherein the storage power manager determines the storage power demand value based on a ratio of data input-output operations performed by the storage device according to requests from the host device during the previous operation and management operations performed by the storage device without requests from the host device during the previous operation period.

8. The computation storage device of claim 1,
wherein the storage power manager determines the storage power demand value based on a following expression:

$$DP1=PR\times[(1-a)\times WR+\alpha]\times\beta,$$

wherein DP1 indicates the storage power demand value, PR indicates the ratio of performance of the storage device during the previous operation period with respect to the maximum performance of the storage device, α indicates the ratio of read operations performed by the storage device during the previous operation period with respect to the read operations and write operations performed by the storage device during the previous operation period, WR indicates the weight constant value of the write operations with respect to the read operations, and β indicates the ratio of data input-output operations performed by the storage device according to requests from the host device with respect to entire operations performed by the storage device during the previous operation period of the storage device.

9. The computation storage device of claim 8,
wherein WR is greater than 1.

10. The computation storage device of claim 1,
wherein the computing device dynamically changes an operation power mode corresponding to workload of the computing device among a plurality of power modes respectively corresponding to a plurality of different power consumptions, such that power consumption of the computing device does not exceed power consumption corresponding the computing target power value.

11. The computation storage device of claim 10, wherein, when the host device requests workload to the computing device during the previous operation period such that power consumption of the computing device exceeds power consumption corresponding to the computing target power value, the computing power manager determines the computing power demand value of a next operation period by increasing the computing power demand value of the previous operation period.

12. The computation storage device of claim 10, wherein, when the host device requests workload to the computing device during the previous operation period such that power consumption of the computing device does not exceed power consumption corresponding to the computing target power value, the computing power manager determines the computing power demand value of a next operation period based on a ratio of a maximum operation power consumption of the operation power mode during the previous operation period with respect to a maximum power consumption among the plurality of power consumptions.

13. The computation storage device of claim 1, wherein the performance of the storage device corresponds to an input-output bandwidth of the storage device, and the performance of the computing device corresponds to an operation frequency of the computing device.

14. The computation storage device of claim 1, wherein the storage device includes:
  a storage power sensor configured to generate a measured storage power value corresponding to the performance of the storage device to change the performance of the storage device based on the storage target power value and the measured storage power value, and
wherein the computing device includes:
  a computing power sensor configured to generate a measured computing power value corresponding to the performance of the computing device to change the performance of the computing device based on the computing target power value and the measured computing power value.

15. The computation storage device of claim 1, wherein the storage device includes:
  a storage power sensor configured to generate a measured storage power value corresponding to the performance of the storage device; and
  a storage temperature sensor configured to generate a storage temperature value by measuring an operation temperature of the storage device, and
wherein the storage power manager changes the performance of the storage device based on the storage target power value, the measured storage power value, the storage temperature value and a storage target temperature value indicating an upper limit of the operation temperature of the storage device.

16. The computation storage device of claim 1, wherein the computing device includes:
  a computing power sensor configured to generate a measured computing power value corresponding to the performance of the computing device; and
  a computing temperature sensor configured to generate a computing temperature value by measuring an operation temperature of the computing device, and
wherein the computing power manager changes the performance of the computing device based on the computing target power value, the measured computing power value, the computing temperature value and a computing target temperature value indicating an upper limit of the operation temperature of the computing device.

17. The computation storage device of claim 1, wherein the storage power manager includes a storage performance monitor (PFM) configured to monitor the previous performance of the storage device, and a storage variable performance controller (VPC) configured to periodically generate the storage power demand value based on the monitored previous performance of the storage device, and
wherein the computing power manager includes a second PFM configured to monitor the previous performance of the computing device, and a second VPC configured to periodically generate the computing power demand value based on the monitored previous performance of the computing device.

18. The computation storage device of claim 1, wherein the global power manager is included in the storage device.

19. A method of managing power of a computation storage device including a storage device and a computing device, the method comprising:
  providing power to a storage device and a computing device through a power rail connected to a host device;
  controlling performance of the storage device based on a storage target power value indicating a power limit of the storage device;
  periodically generating a storage power demand value based on previous performance of the storage device during a previous operation period of the storage device;
  controlling performance of the computing device based on a computing target power value indicating a power limit of the computing device;
  periodically generating a computing power demand value based on previous performance of the computing device during a previous operation period of the computing device; and
  periodically generating the storage target power value and the computing target power value based on the storage power demand value and the computing power demand value,
wherein the storage power demand value is periodically generated based on a ratio of performance of the storage device during the previous operation period with respect to a maximum performance of the storage device, a ratio of read operations performed by the storage device during the previous operation period with respect to the read operations and write operations performed by the storage device during the previous operation period, a weight constant value of the write operations with respect to the read operations, and a ratio of data input-output operations performed by the storage device according to requests from the host device with respect to entire operations performed by the storage device during the previous operation period.

20. A multi-component device comprising:
- a plurality of components configured to perform respective functions and receive power through a power rail connected to a host device;
- a plurality of component power managers configured to control performance of the plurality of components based on a plurality of component target power values indicating respective power limits of the plurality of components and periodically generate a plurality of component power demand values based on previous performance of the plurality of components during previous operation periods of the plurality of components; and
- a global power manager configured to periodically generate the plurality of component target power values based on the plurality of component power demand values,
- wherein the plurality of components comprises a storage device configured to receive a controlled power, store data, and read the stored data, the storage device including a storage power manager, of the plurality of component power managers, configured to periodically generate a storage power demand value based on previous performance of the storage device during a previous operation period of the storage device;
- wherein the storage power manager is configured to periodically generate the storage power demand value based a ratio of performance of the storage device during the previous operation period with respect to a maximum performance of the storage device, a ratio of read operations performed by the storage device during the previous operation period with respect to the read operations and write operations performed by the storage device during the previous operation period, a weight constant value of the write operations with respect to the read operations, and a ratio of data input-output operations performed by the storage device according to requests from the host device with respect to entire operations performed by the storage device during the previous operation period.

* * * * *